United States Patent
Fukuchi et al.

(10) Patent No.: US 12,252,117 B2
(45) Date of Patent: Mar. 18, 2025

(54) VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

(71) Applicant: TOYOTA JIDOSHA KABUSHIKI KAISHA, Toyota Aichi (JP)

(72) Inventors: Nobuaki Fukuchi, Numazu Shizuoka-ken (JP); Daiki Yasui, Atsugi Kanagawa-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 18/099,049

(22) Filed: Jan. 19, 2023

(65) Prior Publication Data

US 2023/0234568 A1    Jul. 27, 2023

(30) Foreign Application Priority Data

Jan. 26, 2022    (JP) .................................. 2022-009790

(51) Int. Cl.
*B60W 30/09*    (2012.01)
*B60W 30/12*    (2020.01)

(52) U.S. Cl.
CPC ............ *B60W 30/09* (2013.01); *B60W 30/12* (2013.01); *B60W 2710/207* (2013.01); *B60W 2720/106* (2013.01)

(58) Field of Classification Search
CPC ................. B60W 30/09; B60W 30/12; B60W 2710/207; B60W 2720/106; B60W 10/04; B60W 10/18; B60W 10/20; B60W 30/095; B60W 30/0953; B60W 30/0956; B60W 40/10; B62D 6/002; B62D 15/0265

See application file for complete search history.

(56) References Cited

U.S. PATENT DOCUMENTS

| | | |
|---|---|---|
| 9,105,190 B2 | 8/2015 | Akiyama |
| 9,393,960 B2 | 7/2016 | Kodaira |
| 9,483,945 B2 | 11/2016 | Okita |
| 9,873,412 B2 | 1/2018 | Moriizumi |

(Continued)

FOREIGN PATENT DOCUMENTS

| | | | | |
|---|---|---|---|---|
| CN | 113753067 A | * | 12/2021 | .......... B60W 10/192 |
| JP | 07160995 A | | 6/1995 | |

(Continued)

*Primary Examiner* — Justin Holmes
(74) *Attorney, Agent, or Firm* — Dinsmore & Shohl LLP

(57) ABSTRACT

The vehicle driving assistance apparatus determines whether an own vehicle departs from an own vehicle moving lane while executing a steering avoidance control. When determining that the own vehicle departs from the own vehicle moving lane while executing the steering avoidance control, the vehicle driving assistance apparatus acquires a steering angle determined by a steering angle control pattern, changes the acquired steering angle to be a value to move the own vehicle toward a center of the own vehicle moving lane, sets the changed steering angle as a target steering angle, acquires a deceleration determined by a deceleration control pattern, increases the acquired deceleration, and sets the increased deceleration as a target deceleration.

6 Claims, 15 Drawing Sheets

(56) References Cited

U.S. PATENT DOCUMENTS

| | | |
|---|---|---|
| 10,793,147 B2 | 10/2020 | Kaminade |
| 2008/0319610 A1 | 12/2008 | Oechsle |
| 2019/0064829 A1 | 2/2019 | Ozawa et al. |
| 2021/0061309 A1 | 3/2021 | Kawanai |
| 2021/0107513 A1* | 4/2021 | Goto ..................... B60W 30/09 |
| 2021/0107521 A1 | 4/2021 | Fujita |
| 2021/0107528 A1 | 4/2021 | Fujita |
| 2021/0146956 A1 | 5/2021 | Fujita |
| 2021/0146958 A1 | 5/2021 | Tanaka |
| 2022/0063607 A1* | 3/2022 | Daniel .................. B60W 10/04 |

FOREIGN PATENT DOCUMENTS

| | | | |
|---|---|---|---|
| JP | 2008529867 A | 8/2008 | |
| JP | 2019043298 A | 3/2019 | |
| WO | WO-2012043665 A1 * | 4/2012 | .......... B60T 8/17557 |

\* cited by examiner

VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

CROSS-REFERENCE TO RELATED APPLICATIONS

This application claims priority to Japanese patent application No. JP 2022-009790 filed on Jan. 26, 2022, the content of which is hereby incorporated by reference in its entirety.

BACKGROUND

Field

The present disclosure relates to a vehicle driving assistance apparatus, a vehicle driving assistance method, and a computer-readable storage medium storing a vehicle driving assistance program.

Description of the Related Art

There is known a vehicle driving assistance apparatus which execute a steering avoidance control as one of automatic driving controls or autonomous driving control (for example, see JP 07-160995 A). The steering avoidance control is a control for avoiding a collision of an own vehicle with an object ahead of the own vehicle by forcibly steering the own vehicle to move the same into a next traffic lane when the own vehicle is determined to collide with the object. The known vehicle driving assistance apparatus is configured to (i) set a route for avoiding the collision of the own vehicle with the object, based on a distance between the own vehicle and the object and a relative speed of the own vehicle to the object for moving the own vehicle into the next traffic lane when the known vehicle driving assistance apparatus determines that the own vehicle collides with the object, and (ii) control the own vehicle to move along the route.

However, there is a situation which does not allow the own vehicle to move into the next traffic lane even when the own vehicle is determined to collide with the object ahead of the own vehicle. In this case, there is an option of forcibly steering the own vehicle so as to pass by the object, keeping the own vehicle within an own vehicle moving lane, i.e., a traffic lane in which the own vehicle moves for avoiding the collision of the own vehicle with the object. In this case, if the own vehicle is moved, only based on the distance between the own vehicle and the object and the relative speed of the own vehicle to the object as the known vehicle driving assistance apparatus described above does, the own vehicle may unfortunately depart from the own vehicle moving lane and move into the next traffic lane.

SUMMARY

An object of the present disclosure is to provide a vehicle driving assistance apparatus, a vehicle driving assistance method, and a vehicle driving assistance program which can prevent the own vehicle from departing from the own vehicle moving lane while executing the steering avoidance control to forcibly steer the own vehicle so as to pass by the object with which the own vehicle predictively collides, keeping the own vehicle within the own vehicle moving lane According to the present disclosure, a vehicle driving assistance apparatus comprises an electronic control unit which executes a steering avoidance control to avoid a collision of an own vehicle with an object ahead of the own vehicle by forcibly braking and steering the own vehicle when the electronic control unit determines that the own vehicle collides with the object.

In the vehicle driving assistance apparatus according to the present disclosure, the steering avoidance control is a control to avoid the collision of the own vehicle with the object by setting a target moving route which passes through a side space of the object and along which the own vehicle is moved by the steering avoidance control, keeping the own vehicle within an own vehicle moving lane in which the own vehicle currently moves, setting (i) a steering angle control pattern corresponding to a control pattern of controlling a steering angle of the own vehicle to move the own vehicle along the target moving route and (ii) a deceleration control pattern corresponding to a control pattern of controlling a deceleration of the own vehicle, setting (i) a target steering angle corresponding to a target value of the steering angle of the own vehicle, based on the steering angle control pattern and (ii) a target deceleration corresponding to a target value of the deceleration of the own vehicle, based on the deceleration control pattern, and controlling (i) the steering angle of the own vehicle so as to correspond to the target steering angle and (ii) the deceleration of the own vehicle so as to correspond to the target deceleration.

In the vehicle driving assistance apparatus according to the present disclosure, the electronic control unit is configured to, when determining that the own vehicle departs from the own vehicle moving lane while executing the steering avoidance control, (i) acquire the steering angle determined by the steering angle control pattern, (ii) change the acquired steering angle to be a value to move the own vehicle toward a center of the own vehicle moving lane, and (iii) set the changed steering angle as the target steering angle, and (i) acquire the deceleration determined by the deceleration control pattern, (ii) increase the acquired deceleration, and (iii) set the increased deceleration as the target deceleration.

With the vehicle driving assistance apparatus according to the present disclosure, when the own vehicle has approached a left or right end of the own vehicle moving lane and is determined to depart from the own vehicle moving lane, a defined steering angle (i.e., the steering angle determined by the steering angle control pattern) is changed to move the own vehicle toward the center of the own vehicle moving lane, and the changed defined steering angle is set as the target steering angle. Thus, the own vehicle can be prevented from departing from the own vehicle moving lane while the steering avoidance control is executed. Further, with the vehicle driving assistance apparatus according to the present disclosure, when the own vehicle is determined to depart from the own vehicle moving lane, and the changed defined steering angle is set as the target steering angle while the steering avoidance control is executed, a defined deceleration (i.e., the deceleration determined by the deceleration control pattern) is increased, and the increased defined deceleration is set as the target deceleration. As a result, the own vehicle is decelerated in a greater manner. Thus, while the steering avoidance control is executed, the own vehicle is decelerated in a greater manner even when the own vehicle has approached the left or right end of the own vehicle moving lane, the changed defined steering angle is set as the target steering angle, and the own vehicle is steered in a greater manner. Thus, the own vehicle can be moved and kept within the own vehicle moving lane while the steering avoidance control is executed.

According to a teaching of the present disclosure, the electronic control unit may be configured to, when determining that the own vehicle does not depart from the own vehicle moving lane while executing the steering avoidance control, (i) acquire the steering angle determined by the steering angle control pattern and (ii) set the acquired steering angle as the target steering angle, and (i) acquire the deceleration determined by the deceleration control pattern and (ii) set the acquired deceleration as the target deceleration.

When the own vehicle does not depart from the own vehicle moving lane while the steering avoidance control is executed, the own vehicle can be moved and kept within the own vehicle moving lane by (i) setting the defined steering angle (i.e., the steering angle determined by the steering angle control pattern) as the target steering angle and (ii) setting the defined deceleration (i.e., the deceleration determined by the deceleration control pattern) as the target deceleration. In this case, the changed defined steering angle and the changed defined deceleration does not need to be set as the target steering angle and the target deceleration, respectively. Under the circumstances, if the changed defined steering angle and the changed defined deceleration are set as the target steering angle and the target deceleration, respectively, it may generate an undesirable situation of providing a driver of the own vehicle with a discomfort. With the vehicle driving assistance apparatus according to this teaching of the present disclosure, when the own vehicle is not determined to depart from the own vehicle moving lane, the defined steering angle and the defined deceleration are set as the target steering angle and the target deceleration, respectively. Thus, the driver of the own vehicle can be prevented from feeling a discomfort while the steering avoidance control is executed.

According to another teaching of the present disclosure, the electronic control unit may be configured to, while executing the steering avoidance control, acquire a deviation amount of the own vehicle from the target moving route when determining that the own vehicle does not depart from the own vehicle moving lane, and (i) determine that the own vehicle departs from the own vehicle moving lane when the deviation amount is equal to or greater than a predetermined deviation amount, (ii) acquire the steering angle determined by the steering angle control pattern, (iii) change the acquired steering angle so as to decrease the deviation amount, and (iv) set the changed steering angle as the target steering angle, (v) acquire the deceleration determined by the deceleration control pattern, (vi) change the acquired deceleration, and (vii) set the changed deceleration as the target deceleration.

While the steering avoidance control is executed, the own vehicle may deviate from the target moving route if the defined steering angle (i.e., the steering angle determined by the steering angle control pattern) is set as the target steering angle, and the defined deceleration (i.e., the deceleration determined by the deceleration control pattern) is set as the target deceleration. With the vehicle driving assistance apparatus according to this teaching of the present disclosure, when the deviation amount of the own vehicle from the target moving route becomes equal to or greater than the predetermined deviation amount while the steering avoidance control is executed, the defined steering angle and the defined deceleration corrected to decrease the deviation amount are set as the target steering angle and the target deceleration, respectively. Thus, the own vehicle can be moved along the target moving route while the steering avoidance control is executed.

According to further another teaching of the present disclosure, the electronic control unit may be configured to, when determining that the own vehicle does not depart from the own vehicle moving lane, and the deviation amount is smaller than the predetermined deviation amount while executing the steering avoidance control, (i) set the steering angle determined by the steering angle control pattern as the target steering angle and (ii) set the deceleration determined by the deceleration control pattern as the target deceleration.

When the own vehicle does not depart from the own vehicle moving lane, and the deviation amount of the own vehicle from the target moving route is small while the steering avoidance control is executed, the own vehicle can be moved along the target moving route and kept within the own vehicle moving lane if the defined steering angle (i.e., the steering angle determined by the steering angle control pattern) is set as the target steering angle, and the defined deceleration (i.e., the deceleration determined by the deceleration control pattern) is set as the target deceleration. In this case, the changed defined steering angle and the changed defined deceleration does not need to be set as the target steering angle and the target deceleration, respectively. Under the circumstances, if the changed defined steering angle and the changed defined deceleration are set as the target steering angle and the target deceleration, respectively, it may generate an undesirable situation of providing the driver of the own vehicle with a discomfort. With the vehicle driving assistance apparatus according to this teaching of the present disclosure, when the own vehicle is not determined to depart from the own vehicle moving lane, and the deviation amount of the own vehicle from the target moving route, the defined steering angle and the defined deceleration are set as the target steering angle and the target deceleration, respectively. Thus, the driver of the own vehicle can be prevented from feeling a discomfort while the steering avoidance control is executed.

According to the present disclosure, a vehicle driving assistance method is a method for executing a steering avoidance control to avoid a collision of an own vehicle with an object ahead of the own vehicle by forcibly braking and steering the own vehicle when the electronic control unit determines that the own vehicle collides with the object.

In the vehicle driving assistance method according to the present disclosure, the steering avoidance control is a control to avoid the collision of the own vehicle with the object by setting a target moving route which passes through a side space of the object and along which the own vehicle is moved by the steering avoidance control, keeping the own vehicle within an own vehicle moving lane in which the own vehicle currently moves, setting (i) a steering angle control pattern corresponding to a control pattern of controlling a steering angle of the own vehicle to move the own vehicle along the target moving route and (ii) a deceleration control pattern corresponding to a control pattern of controlling a deceleration of the own vehicle, setting (i) a target steering angle corresponding to a target value of the steering angle of the own vehicle, based on the steering angle control pattern and (ii) a target deceleration corresponding to a target value of the deceleration of the own vehicle, based on the deceleration control pattern, and controlling (i) the steering angle of the own vehicle so as to correspond to the target steering angle and (ii) the deceleration of the own vehicle so as to correspond to the target deceleration.

Further, the vehicle driving assistance method according to the present disclosure comprises steps of, when determining that the own vehicle departs from the own vehicle moving lane while executing the steering avoidance control, (i) acquiring the steering angle determined by the steering angle control pattern, (ii) changing the acquired steering angle to be a value to move the own vehicle toward a center of the own vehicle moving lane, and (iii) setting the changed steering angle as the target steering angle, and (i) acquiring the deceleration determined by the deceleration control pattern, (ii) increasing the acquired deceleration, and (iii) setting the increased deceleration as the target deceleration.

With the vehicle driving assistance method according to the present disclosure, while the steering avoidance control is executed, the own vehicle is decelerated in a greater manner even when the own vehicle has approached the left or right end of the own vehicle moving lane, the changed defined steering angle is set as the target steering angle, and the own vehicle is steered in a greater manner. Thus, the own vehicle can be moved and kept within the own vehicle moving lane while the steering avoidance control is executed.

According to the present disclosure, a computer-readable storage medium stores a vehicle driving assistance program which executes a steering avoidance control to avoid a collision of an own vehicle with an object ahead of the own vehicle by forcibly braking and steering the own vehicle when the electronic control unit determines that the own vehicle collides with the object.

In the computer-readable storage medium according to the present disclosure, the steering avoidance control is a control to avoid the collision of the own vehicle with the object by setting a target moving route which passes through a side space of the object and along which the own vehicle is moved by the steering avoidance control, keeping the own vehicle within an own vehicle moving lane in which the own vehicle currently moves, setting (i) a steering angle control pattern corresponding to a control pattern of controlling a steering angle of the own vehicle to move the own vehicle along the target moving route and (ii) a deceleration control pattern corresponding to a control pattern of controlling a deceleration of the own vehicle, setting (i) a target steering angle corresponding to a target value of the steering angle of the own vehicle, based on the steering angle control pattern and (ii) a target deceleration corresponding to a target value of the deceleration of the own vehicle, based on the deceleration control pattern, and controlling (i) the steering angle of the own vehicle so as to correspond to the target steering angle and (ii) the deceleration of the own vehicle so as to correspond to the target deceleration.

Further, in the computer-readable storage medium, the vehicle driving assistance program is configured to, when determining that the own vehicle departs from the own vehicle moving lane while executing the steering avoidance control, (i) acquire the steering angle determined by the steering angle control pattern, (ii) change the acquired steering angle to be a value to move the own vehicle toward a center of the own vehicle moving lane, and (iii) set the changed steering angle as the target steering angle, and (i) acquire the deceleration determined by the deceleration control pattern, (ii) increase the acquired deceleration, and (iii) set the increased deceleration as the target deceleration.

With the computer-readable storage medium storing the vehicle driving assistance program according to the present disclosure, while the steering avoidance control is executed, the own vehicle is decelerated in a greater manner even when the own vehicle has approached the left or right end of the own vehicle moving lane, the changed defined steering angle is set as the target steering angle, and the own vehicle is steered in a greater manner. Thus, the own vehicle can be moved and kept within the own vehicle moving lane while the steering avoidance control is executed.

According to the present disclosure, a vehicle driving assistance apparatus comprises an electronic control unit which executes a steering avoidance control for avoiding a collision of an own vehicle with an object ahead of the own vehicle by forcibly braking and steering the own vehicle when determining that the own vehicle collides with the object. The electronic control unit is configured to, when determining that the own vehicle departs from the own vehicle moving lane while executing the steering avoidance control, (i) turn the own vehicle toward a center of an own vehicle moving lane in which the own vehicle currently moves and (ii) increase a deceleration of the own vehicle.

With the vehicle driving assistance apparatus according to the present disclosure, when the own vehicle has approached the left or right end of the own vehicle moving lane while the steering avoidance control is executed, and the own vehicle has a probability of departing from the own vehicle moving lane, the own vehicle is turned toward the center of the own vehicle moving lane, and the deceleration of the own vehicle is increased. Thus, while the steering avoidance control is executed, the own vehicle can be prevented from departing from the own vehicle moving lane. In addition, even when the own vehicle is turned in a greater manner, the own vehicle is braked in a greater manner. Thus, the own vehicle can be moved and kept within the own vehicle moving lane while the steering avoidance control is executed.

Elements of the present disclosure are not limited to elements of embodiments and modified examples of the present disclosure described with reference to the drawings. The other objects, features and accompanied advantages of the present disclosure can be easily understood from the embodiments and the modified examples of the present disclosure.

DESCRIPTION OF THE EMBODIMENTS

Figure 1:
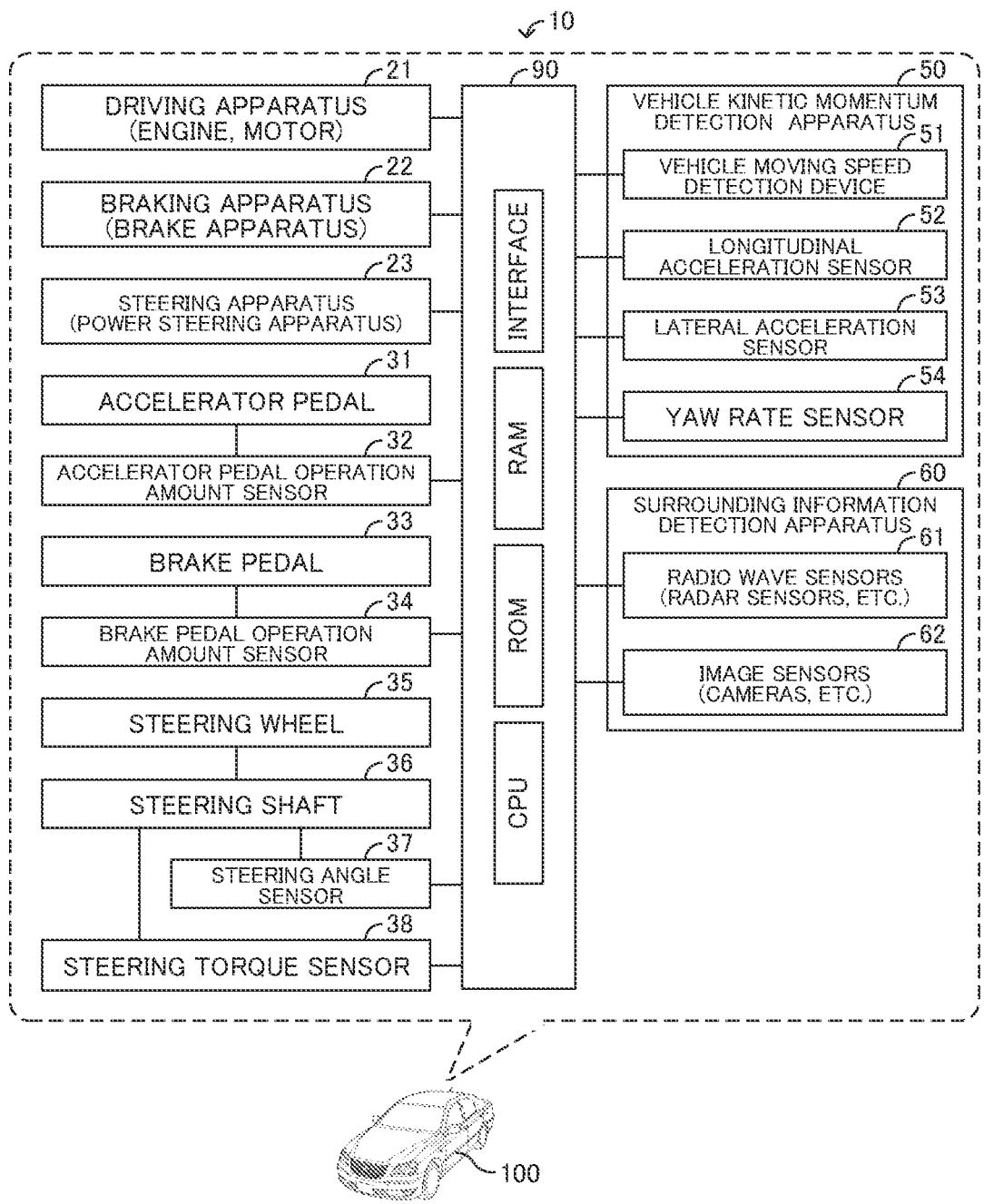
FIG. 1 is a view which shows a vehicle driving assistance apparatus according to an embodiment of the present disclosure and a vehicle or an own vehicle installed with the vehicle driving assistance apparatus.

Below, a vehicle driving assistance apparatus, a vehicle driving assistance method, and a computer-readable storage medium storing a vehicle driving assistance program according to an embodiment of the present disclosure will be described with reference to the drawings. As shown in FIG. 1, the vehicle driving assistance apparatus 10 according to the embodiment of the present disclosure is installed on an own vehicle 100.

<ECU>

The vehicle driving assistance apparatus 10 includes an ECU 90 as a control device. ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, programs, or routines stored in the ROM. In particular, the CPU is configured or programmed to execute the vehicle driving assistance program stored in the ROM as the computer-readable storage medium.

<Driving Apparatus, Etc.>

Further, the own vehicle 100 is installed with a driving apparatus 21, a braking apparatus 22, and a steering apparatus 23.

<Driving Apparatus>

The driving apparatus 21 is an apparatus which outputs a driving force or a driving torque to be applied to the own vehicle 100 to move the same. The driving apparatus 21 includes, for example, an internal combustion engine and at least one electric motor. The driving apparatus 21 is electrically connected to the ECU 90. The ECU 90 controls the driving force output from the driving apparatus 21 by controlling operations of the driving apparatus 21. Thus, the ECU 90 controls an acceleration of the own vehicle 100 by controlling the operations of the driving apparatus 21.

<Braking Apparatus>

The braking apparatus 22 is an apparatus which outputs a braking force or a braking torque to be applied to the own vehicle 100 to brake the same. The braking apparatus 22 includes, for example, a brake apparatus. The braking apparatus 22 is electrically connected to the ECU 90. The ECU 90 controls the braking force output from the braking apparatus 22 by controlling operations of the braking apparatus 22. Thus, the ECU 90 controls a deceleration of the own vehicle 100 by controlling the operations of the braking apparatus 22.

<Steering Apparatus>

The steering apparatus 23 is an apparatus which outputs a steering force or a steering torque to be applied to the own vehicle 100 to steer the same. The steering apparatus 23 includes, for example, a power steering apparatus. The steering apparatus 23 is electrically connected to the ECU 90. The ECU 90 controls the steering force output from the steering apparatus 23 by controlling operations of the steering apparatus 23. Thus, the ECU 90 controls a steering angle of the own vehicle 100 by controlling the operations of the steering apparatus 23.

<Sensors, Etc.>

Further, the own vehicle 100 is installed with an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle kinetic momentum detection apparatus 50, a surrounding information detection apparatus 60.

<Accelerator Pedal Operation Amount Sensor>

The accelerator pedal operation amount sensor 32 is a sensor which detects an operation amount of the accelerator pedal 31. The accelerator pedal operation amount sensor 32 is electrically connected to the ECU 90. The accelerator pedal operation amount sensor 32 sends information on the detected operation amount of the accelerator pedal 31 to the ECU 90. The ECU 90 acquires the operation amount of the accelerator pedal 31 as an accelerator pedal operation amount AP, based on the information sent from the accelerator pedal operation amount sensor 32.

The ECU 90 calculates and acquires a requested driving force or a requested driving torque, based on the accelerator pedal operation amount AP and a moving speed of the own vehicle 100. The requested driving force is the driving force which the driving apparatus 21 is requested to output. The ECU 90 controls the operations of the driving apparatus 21 so as to output the driving force corresponding to the requested driving force when not executing a steering avoidance control described later in detail.

<Brake Pedal Operation Amount Sensor>

The brake pedal operation amount sensor 34 is a sensor which detects an operation amount of the brake pedal 33. The brake pedal operation amount sensor 34 is electrically connected to the ECU 90. The brake pedal operation amount sensor 34 sends information on the detected operation amount of the brake pedal 33 to the ECU 90. The ECU 90 acquires the operation amount of the brake pedal 33 as a brake pedal operation amount BP, based on the information sent from the brake pedal 33.

The ECU 90 calculates and acquires a requested braking force or a requested braking torque, based on the brake pedal operation amount BP. The requested braking force is the braking force which the braking apparatus 22 is requested to output. The ECU 90 controls the operations of the braking apparatus 22 so as to output the braking force corresponding to the requested braking force when not executing the steering avoidance control described later in detail.

<Steering Angle Sensor>

The steering angle sensor 37 is a sensor which detects a rotation angle of the steering shaft 36 with respect to its neutral position. The steering angle sensor 37 is electrically connected to the ECU 90. The steering angle sensor 37 sends information on the detected rotation angle of the steering shaft 36 to the ECU 90. The ECU 90 acquires the rotation angle of the steering shaft 36 as a steering angle AG, based on the information sent from the steering angle sensor 37.

<Steering Torque Sensor>

The steering torque sensor 38 is a sensor which detects a torque which a driver of the own vehicle 100 inputs to the steering shaft 36 with the steering wheel 35. The steering torque sensor 38 is electrically connected to the ECU 90. The steering torque sensor 38 sends information on the detected torque to the ECU 90. The ECU 90 acquires the torque which the driver inputs to the steering shaft 36 with the steering wheel 35 as a driver input torque, based on the information sent from the steering torque sensor 38.

<Vehicle Kinetic Momentum Detection Apparatus>

The vehicle kinetic momentum detection apparatus 50 is an apparatus which detects kinetic momentum of the own vehicle 100. In this embodiment, the vehicle kinetic momentum detection apparatus 50 includes a vehicle moving speed detection device 51, a longitudinal acceleration sensor 52, a lateral acceleration sensor 53, and a yaw rate sensor 54.

<Vehicle Moving Speed Detection Device>

The vehicle moving speed detection device 51 is a device which detects the moving speed of the own vehicle 100. The vehicle moving speed detection device 51 includes, for example, vehicle wheel rotation speed sensors. The vehicle moving speed detection device 51 is electrically connected to the ECU 90. The vehicle moving speed detection device 51 sends information on the detected moving speed of the own vehicle 100 to the ECU 90. The ECU 90 acquires the moving speed of the own vehicle 100 as an own vehicle moving speed V100, based on the information sent from the vehicle moving speed detection device 51.

The ECU 90 calculates and acquires a requested steering force or a requested steering torque, based on the steering angle AG, the driver input torques, and the own vehicle moving speed V100. The requested steering force is the steering force which the steering apparatus 23 is requested to output. The ECU 90 controls the operations of the steering apparatus 23 so as to output the steering force corresponding to the requested steering force when not executing the steering avoidance control described later in detail.

<Longitudinal Acceleration Sensor>

The longitudinal acceleration sensor 52 is a sensor which detects an acceleration of the own vehicle 100 in a longitudinal direction of the own vehicle 100. The longitudinal acceleration sensor 52 is electrically connected to the ECU 90. The longitudinal acceleration sensor 52 sends information on the detected acceleration to the ECU 90. The ECU 90 acquires the acceleration of the own vehicle 100 in the longitudinal direction of the own vehicle 100 as a longitudinal acceleration Gx, based on the information sent from the longitudinal acceleration sensor 52.

<Lateral Acceleration Sensor>

The lateral acceleration sensor 53 is a sensor which detects an acceleration of the own vehicle 100 in a lateral direction or a width direction of the own vehicle 100. The lateral acceleration sensor 53 is electrically connected to the ECU 90. The lateral acceleration sensor 53 sends information on the detected acceleration to the ECU 90. The ECU 90 acquires the acceleration of the own vehicle 100 in the lateral direction of the own vehicle 100 as a lateral acceleration Gy, based on the information sent from the lateral acceleration sensor 53.

<Yaw Rate Sensor>

The yaw rate sensor 54 is a sensor which detects a yaw rate YR of the own vehicle 100. The yaw rate sensor 54 is electrically connected to the ECU 90. The yaw rate sensor 54 sends information on the detected yaw rate to the ECU 90. The ECU 90 acquires the yaw rate of the own vehicle 100 as a yaw rate YR, based on the information sent from the yaw rate sensor 54.

It should be noted that an IMU (Inertial Measurement Unit) in which the longitudinal acceleration sensor 52, the lateral acceleration sensor 53, and the yaw rate sensor 54 are integrated, may be used in place of the longitudinal acceleration sensor 52, the lateral acceleration sensor 53, and the yaw rate sensor 54.

<Surrounding Information Detection Apparatus>

The surrounding information detection apparatus 60 is an apparatus which detects information on a situation around the own vehicle 100. In this embodiment, the surrounding information detection apparatus 60 includes radio wave sensors 61 and image sensors 62. The radio wave sensor 61 is, for example, a radar sensor such as a millimeter wave radar. The image sensor 62 is, for example, a camera. It should be noted that the surrounding information detection apparatus 60 may include sonic wave sensors such as ultrasonic wave sensors such as clearance sonars, or optical sensors such as laser radars such as LiDARs, or ToF sensors (Time of Flight sensors).

<Radio Wave Sensors>

The radio wave sensors 61 are electrically connected to the ECU 90. The radio wave sensor 61 transmits radio waves and receives reflected waves, i.e., the radio waves reflected by objects. The radio wave sensors 61 send information or detection results on the transmitted radio waves and the received reflected waves to the ECU 90. In other words, the radio wave sensors 61 detect objects around the own vehicle 100 and send information or detection results on the detected objects to the ECU 90. The ECU 90 acquires the information on the objects around the own vehicle 100 as surrounding detection information ID, based on the information or radio wave information sent from the radio wave sensors 61.

It should be noted that in this embodiment, the object is a vehicle, a motorcycle, a bicycle, or a person.

<Image Sensors>

The image sensors 62 are electrically connected to the ECU 90. The image sensor 62 takes images of a view around the own vehicle 100 and sends information on the taken images to the ECU 90. The ECU 90 acquires the information on the situation around the own vehicle 100 as the surrounding detection information ID, based on the information or image information sent from the image sensors 62.

Figure 2:
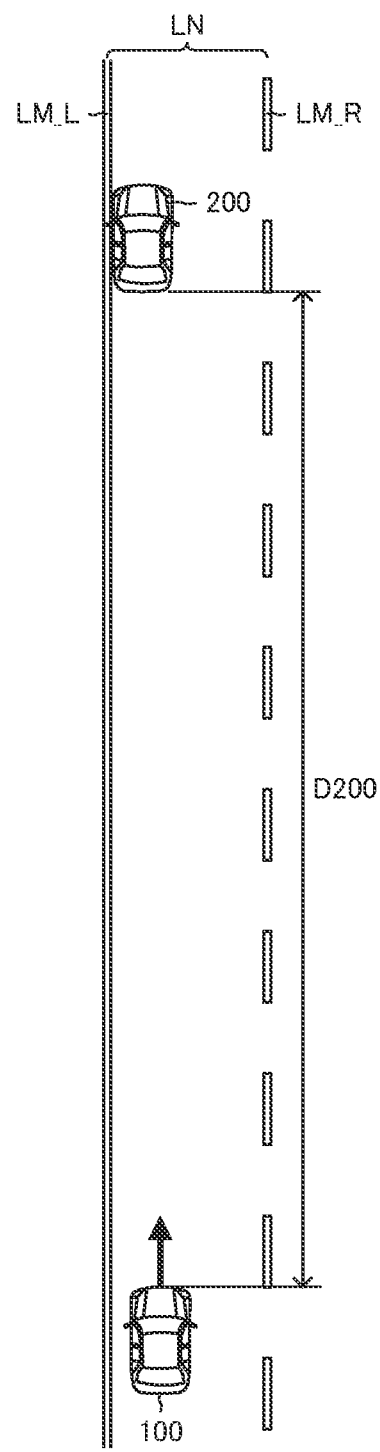
FIG. 2 is a view which shows a distance between the own vehicle and an object or another vehicle ahead of the own vehicle.

As shown in FIG. 2, when there is a forward object 200 (i.e., an object ahead of the own vehicle 100), the ECU 90 detects the forward object 200, based on the surrounding detection information ID. It should be noted that the forward object 200 is a vehicle, a motorcycle, a bicycle, or a person. In an example shown in FIG. 2, the forward object 200 is the vehicle.

When the ECU 90 detects the forward object 200, the ECU 90 acquires, for example, an object distance D200 and a relative speed ΔV200, based on the surrounding detection information ID. The object distance D200 is a distance between the forward object 200 and the own vehicle 100. The relative speed ΔV200 is a moving speed of the own vehicle 100 with respect to the forward object 200.

In addition, the ECU 90 recognizes a left lane marking LM_L and a right lane marking LM_R, based on the surrounding detection information ID. The left lane marking LM_L and the right lane marking LM_R define an own vehicle moving lane LN, i.e., a moving lane in which the own vehicle 100 currently moves. The ECU 90 specifies an area of the own vehicle moving lane LN, based on the recognized left lane marking LM_L and the recognized right lane marking LM_R.

<Summary of Operations of Vehicle Driving Assistance Apparatus>

Next, a summary of operations of the vehicle driving assistance apparatus 10 will be described.

The vehicle driving assistance apparatus 10 executes a process to detect the object such as the vehicle ahead of the own vehicle 100 in a moving direction of the own vehicle 100, based on the surrounding detection information ID while the own vehicle 100 moves. While the vehicle driving assistance apparatus 10 does not detect any objects ahead of the own vehicle 100 in the moving direction of the own vehicle 100, the vehicle driving assistance apparatus 10 executes an ordinary moving control.

The ordinary moving control is a control to (i) control the operations of the driving apparatus 21 so as to output the driving force corresponding to the requested driving force when the requested driving force is greater than zero, (ii) control the operations of the braking apparatus 22 so as to output the braking force corresponding to the requested braking force when the requested braking force is greater than zero, and (iii) control the operations of the steering apparatus 23 so as to output the steering force corresponding to the requested steering force when the requested steering force is greater than zero.

When the vehicle driving assistance apparatus 10 detects the object ahead of the own vehicle 100 in the moving direction of the own vehicle 100, the vehicle driving assistance apparatus 10 determines, based on the surrounding detection information ID, whether the object, i.e., the forward object 200 is in a predicted moving area A100.

Figure 3A:
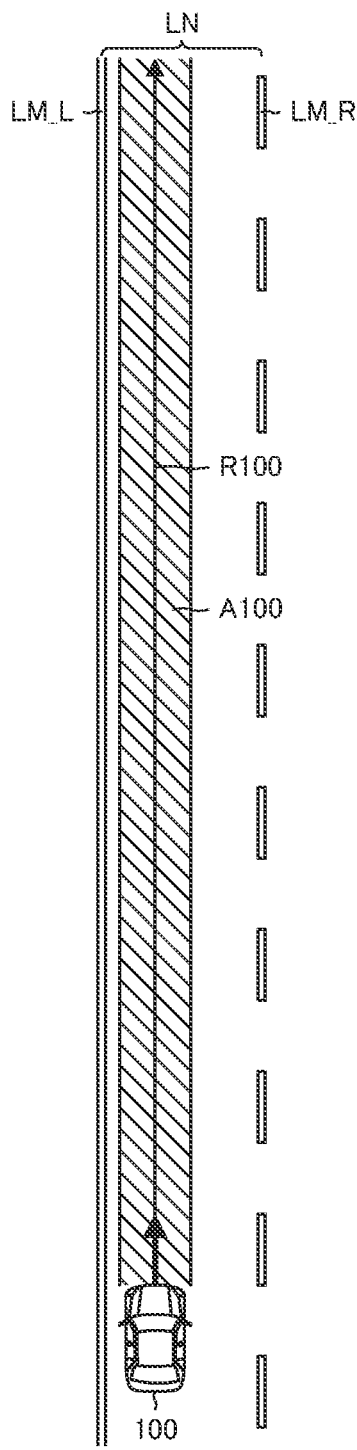
FIG. 3A is a view which shows a predicted moving area of the own vehicle.

As shown in FIG. 3A, the predicted moving area A100 is an area which has a center line corresponding to a predicted moving route R100 of the own vehicle 100 and a width corresponding to a width of the own vehicle 100. The predicted moving route R100 is a moving route along which the own vehicle 100 predictively moves assuming that the own vehicle 100 moves, maintaining the current steering angle AG. The predicted moving route R100 shown in FIG. 3A is a straight line, however, may be a curved line, depending on the situations.

When the detected forward object 200 is not in the predicted moving area A100, the vehicle driving assistance apparatus 10 continues executing the ordinary moving control.

Figure 3B:
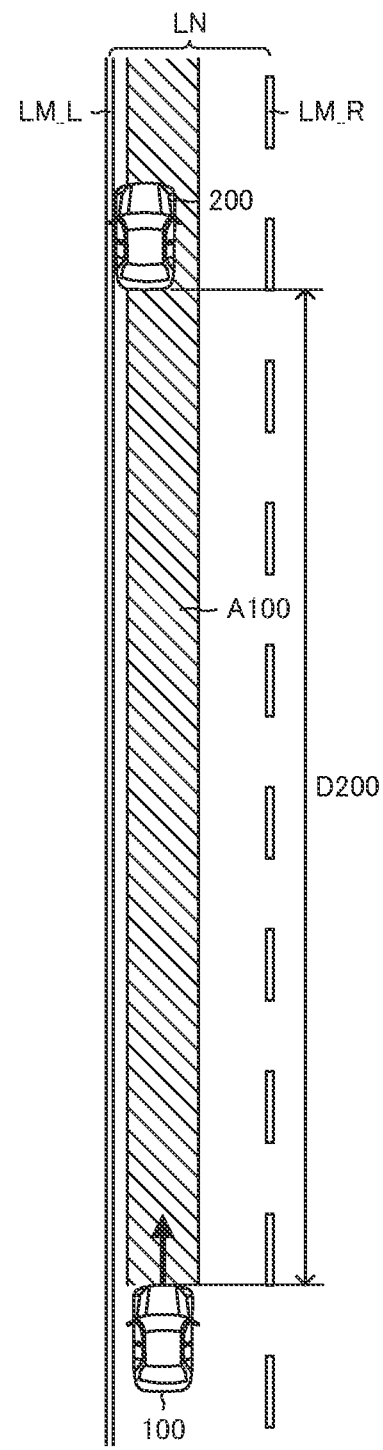
FIG. 3B is a view which shows a scene that there is an object or another vehicle in the predicted moving area of the own vehicle.

On the other hand, when the vehicle driving assistance apparatus 10 determines that the detected forward object 200 is in the predicted moving area A100 as shown in FIG. 3B, the vehicle driving assistance apparatus 10 acquires a predicted reaching time TTC. The predicted reaching time TTC is a time predictively taken for the own vehicle 100 to reach the forward object 200. The vehicle driving assistance apparatus 10 acquires the predicted reaching time TTC by dividing the object distance D200 by the relative speed ΔV200 (TTC=D200/ΔV200). While the vehicle driving assistance apparatus 10 determines that the forward object 200 is in the predicted moving area A100, the vehicle driving assistance apparatus 10 acquires the object distance D200, the relative speed ΔV200, and the predicted reaching time TTC with a predetermined calculation cycle.

When the relative speed ΔV200 is constant, the predicted reaching time TTC decreases as the own vehicle 100 approaches the forward object 200. Thus, the predicted reaching time TTC is an index which represents a probability that the own vehicle 100 does not collide with the forward object 200. The index decreases as the predicted reaching time TTC decreases. In addition, the index decreases as the probability that the own vehicle 100 does not collide with the forward object 200, decreases.

The vehicle driving assistance apparatus 10 determines whether the predicted reaching time TTC decreases to a predetermined time or a collision determination time TTCth. When the predicted reaching time TTC is greater than the collision determination time TTCth, the vehicle driving assistance apparatus 10 continues executing the ordinary moving control.

When (i) no collision avoidance steering wheel maneuvering is carried out by the driver of the own vehicle 100, that is, a maneuvering to the steering wheel 35 to avoid a collision of the own vehicle 100 with the forward object 200 is not carried out by the driver of the own vehicle 100, and (ii) the own vehicle 100 has approached the forward object 200, and (iii) the predicted reaching time TTC decreases to the collision determination time TTCth, the own vehicle 100 determines that the own vehicle 100 collides with the forward object 200 if the own vehicle 100 moves without change. When the vehicle driving assistance apparatus 10 determines that the own vehicle 100 collides with the forward object 200, the vehicle driving assistance apparatus 10 determines that a steering avoidance control execution condition becomes satisfied.

When the vehicle driving assistance apparatus 10 determines that the steering avoidance control execution condition becomes satisfied, the vehicle driving assistance apparatus 10 sets a target moving route Rtgt. In addition when the vehicle driving assistance apparatus 10 determines that the steering avoidance control execution condition becomes satisfied, the vehicle driving assistance apparatus 10 sets the forward object 200 as an avoidance target object 200tgt.

Figure 4A:
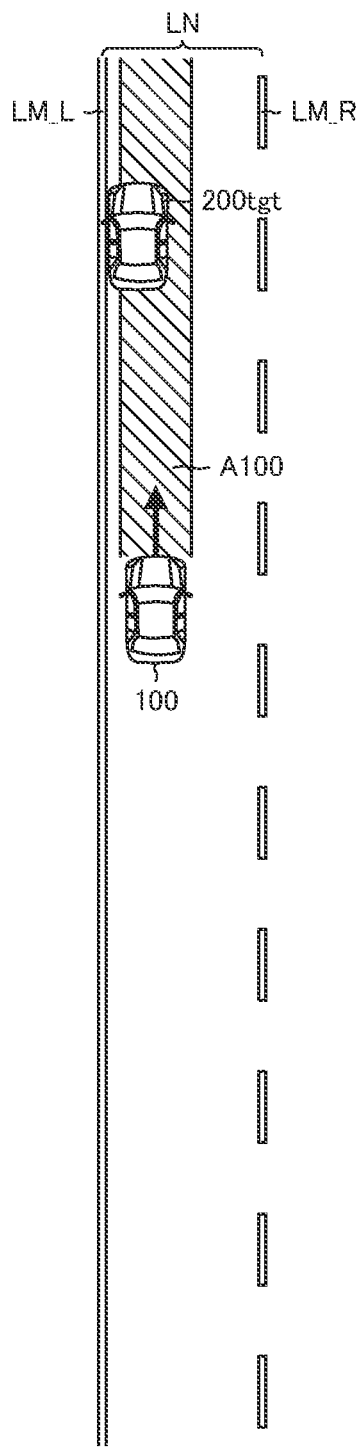
FIG. 4A is a view which shows a scene that the own vehicle has approached the object or the other vehicle ahead of the own vehicle, and a steering avoidance control execution condition becomes satisfied.
Figure 4B:
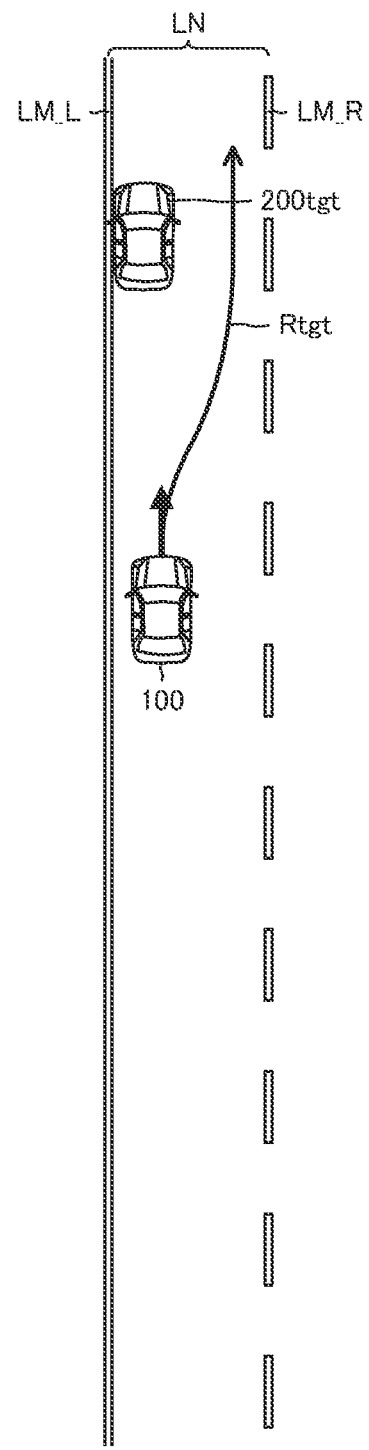
FIG. 4B is a view which shows a target moving route set by a steering avoidance control.

The target moving route Rtgt is a route along which the own vehicle 100 is caused to move by the steering avoidance control to avoid the collision of the own vehicle 100 with the avoidance target object 200tgt by passing by the avoidance target object 200tgt within the own vehicle moving lane LN as shown in FIG. 4B.

The target moving route Rtgt shown in FIG. 4B is a route passing through the right side of the avoidance target object 200tgt. In this regard, the target moving route Rtgt may be a route passing through the left side of the avoidance target object 200tgt when there is a space at the left side of the avoidance target object 200tgt which the own vehicle 100 can pass within the own vehicle moving lane LN.

When the vehicle driving assistance apparatus 10 sets the target moving route Rtgt, the vehicle driving assistance apparatus 10 sets (i) a steering angle control pattern (i.e., a pattern of controlling the steering angle of the own vehicle 100 to move the own vehicle 100 along the target moving route Rtgt) and (ii) a deceleration control pattern (i.e., a pattern of controlling a deceleration of the own vehicle 100 while moving the own vehicle 100 along the target moving route Rtgt).

While the vehicle driving assistance apparatus 10 executes the steering avoidance control, the vehicle driving assistance apparatus 10 sets a target steering angle AGtgt, based on the steering angle control pattern. The target steering angle AGtgt is a target value of the steering angle of the own vehicle 100. In addition, while the vehicle driving assistance apparatus 10 executes the steering avoidance control, the vehicle driving assistance apparatus 10 sets a target deceleration Gtgt, based on the deceleration control pattern. The target deceleration Gtgt is a target value of the deceleration of the own vehicle 100.

Then, the vehicle driving assistance apparatus 10 controls the steering angle of the own vehicle 100 at the target steering angle AGtgt and controls the deceleration of the own vehicle 100 at the target deceleration Gtgt.

Figure 5A:
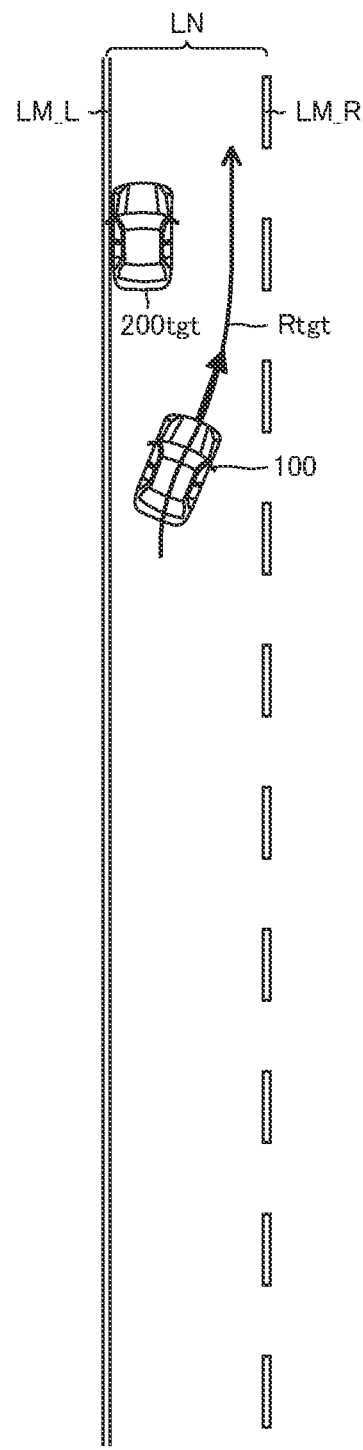
FIG. 5A is a view which shows a scene that the own vehicle starts to be moved along the target moving route by the steering avoidance control.
Figure 5B:
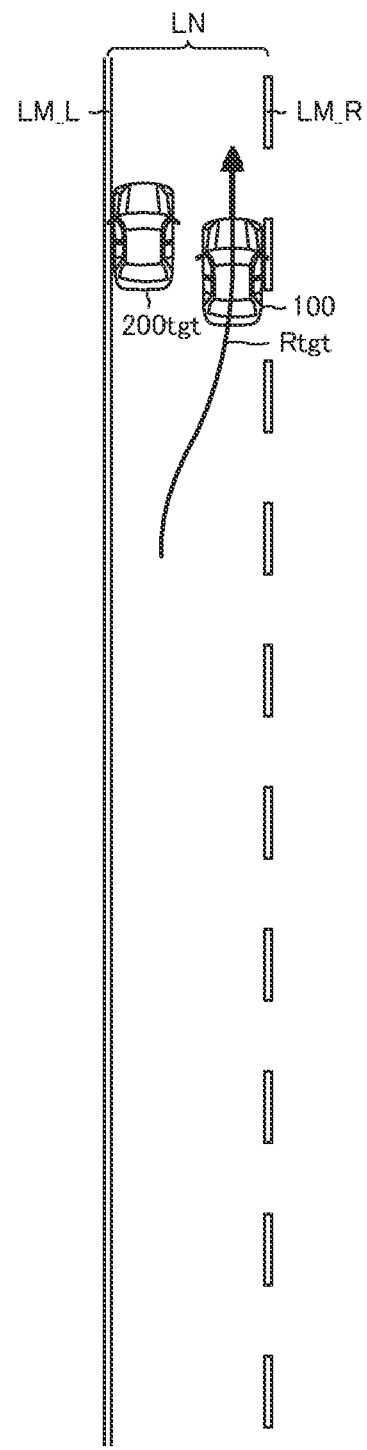
FIG. 5B is a view which shows a scene that the own vehicle passes by the object or the other vehicle by the steering avoidance control.
Figure 5C:
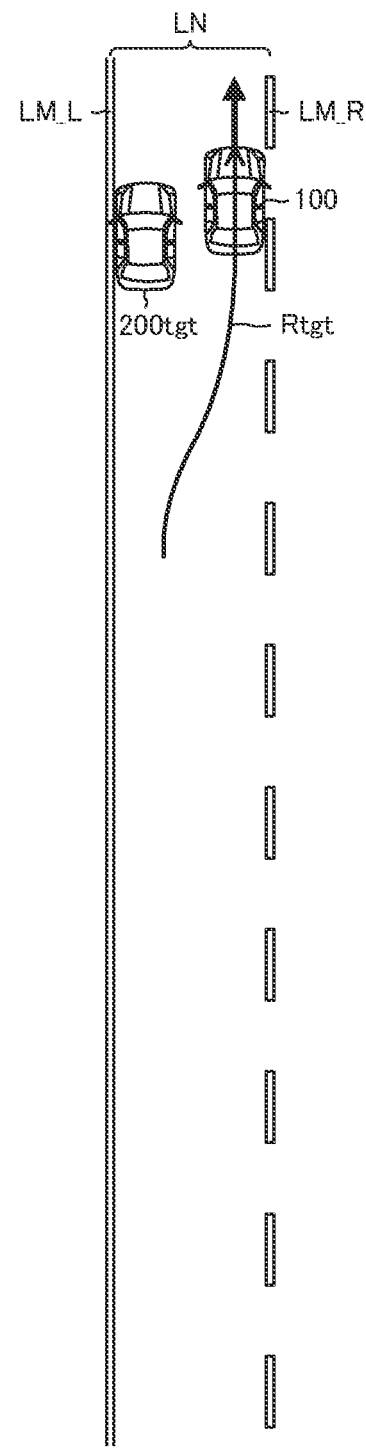
FIG. 5C is a view which shows a scene that executing the steering avoidance control is terminated after the own vehicle has passed by the object or the other vehicle.

Thereby, the own vehicle 100 starts to turn right as shown in FIG. 5A. Immediately thereafter, the own vehicle 100 turns in an opposite direction, i.e., left and then, the moving direction of the own vehicle 100 becomes parallel to the own vehicle moving lane LN. Then, as shown in FIG. 5B, the own vehicle 100 passes by the avoidance target object 200tgt. Thereby, the collision of the own vehicle 100 with the avoidance target object 200tgt is avoided. When the own vehicle 100 has passed by the avoidance target object 200tgt as shown in FIG. 5C, the vehicle driving assistance apparatus 10 determines that the collision of the own vehicle 100 with the avoidance target object 200tgt has been avoided and terminates executing the steering avoidance control.

It should be noted that the vehicle driving assistance apparatus 10 may be configured not to set the target moving route Rtgt when the steering avoidance control execution condition becomes satisfied if there is no space through which the own vehicle 100 passes at the side of the avoidance target object 200tgt, and thus there is no route along which the own vehicle 100 is moved to pass by the avoidance target object 200tgt within the own vehicle moving lane LN. When the vehicle driving assistance apparatus 10 does not set the target moving route Rtgt, the own vehicle 100 does not execute the steering avoidance control.

Further, the vehicle driving assistance apparatus 10 may be configured to stop executing the steering avoidance control when the driver input torque becomes equal to or greater than a predetermined relatively great torque while executing the steering avoidance control, in other words, when an operation amount of the steering wheel 35 by the driver of the own vehicle 100 becomes equal to or greater than a predetermined amount while executing the steering avoidance control.

<Setting of Target Steering Angle and Target Deceleration>

As described above, while executing the steering avoidance control, the vehicle driving assistance apparatus 10 sets the target steering angle AGtgt, based on the steering angle control pattern and sets the target deceleration Gtgt, based on the deceleration control pattern.

If a defined steering angle AGbase (i.e., the steering angle determined by the steering angle control pattern) is set as the target steering angle AGtgt, and a defined deceleration Gbase (i.e., the deceleration determined by the deceleration control pattern) is set as the target deceleration Gtgt, the own vehicle 100 should be moved along the target moving route Rtgt without departing from the own vehicle moving lane LN.

However, the own vehicle 100 may depart from the own vehicle moving lane LN even by executing the steering avoidance control by setting the defined steering angle AGbase as the target steering angle AGtgt and setting the defined deceleration Gbase as the target deceleration Gtgt due to properties of the steering apparatus 23 and the braking apparatus 22 of the own vehicle 100 and a state of a road surface on which the own vehicle 100 moves.

<First Process>

Accordingly, while the vehicle driving assistance apparatus 10 executes the steering avoidance control, the vehicle driving assistance apparatus 10 changes the target steering angle AGtgt so as to move the own vehicle 100 toward a center of the own vehicle moving lane LN when the vehicle driving assistance apparatus 10 determines that the own vehicle 100 departs from the own vehicle moving lane LN. In other words, when the vehicle driving assistance apparatus 10 determines that the own vehicle 100 departs from the own vehicle moving lane LN while executing the steering avoidance control, the vehicle driving assistance apparatus 10 executes the steering avoidance control by changing the target steering angle AGtgt so as to move the own vehicle 100 away from a lane end END of the own vehicle moving lane LN beyond which the own vehicle 100 is moving.

Figure 6A:
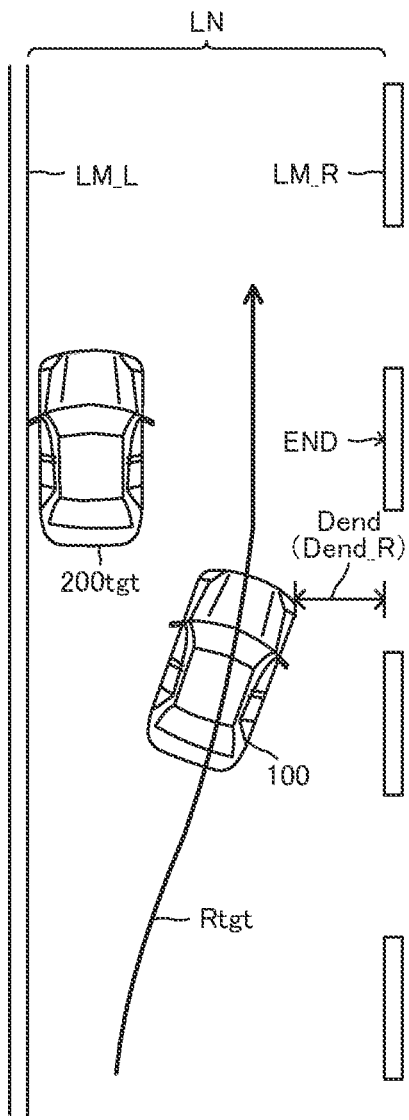
FIG. 6A is a view which shows a right end distance.
Figure 6B:
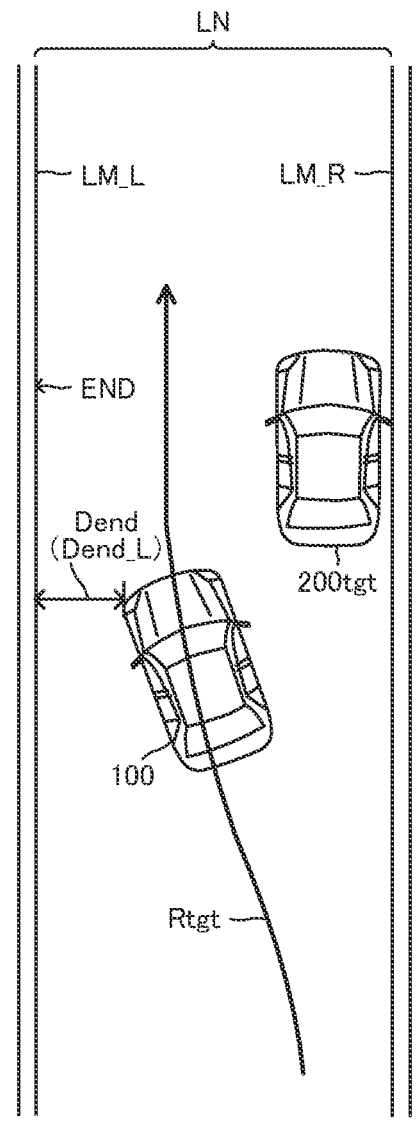
FIG. 6B is a view which shows a left end distance.

In particular, in this embodiment, when the vehicle driving assistance apparatus 10 starts executing the steering avoidance control, the vehicle driving assistance apparatus 10 acquires a lane end distance Dend. The lane end distance Dend is one of a right end distance Dend_R and a left end distance Dend_L. As shown in FIG. 6A, the right end distance Dend_R is a distance between the own vehicle 100 (in particular, a right front corner portion of the own vehicle 100) and the right lane end END (a right end of the own vehicle moving lane LN). In an example shown in FIG. 6A, the right lane end END is the right lane marking LM_R. Similarly, as shown in FIG. 6B, the left end distance Dend_L is a distance between the own vehicle 100 (in particular, a left front corner portion of the own vehicle 100) and the left lane end END (a left end of the own vehicle moving lane LN). In an example shown in FIG. 6B, the left lane end END is the left lane marking LM_L.

When the target moving route Rtgt passes through the right side of the avoidance target object 200tgt, the vehicle driving assistance apparatus 10 acquires a right end distance Dend_R as the lane end distance Dend. On the other hand, when the target moving route Rtgt passes through the left side of the avoidance target object 200tgt, the vehicle driving assistance apparatus 10 acquires a left end distance Dend_L as the lane end distance Dend.

While executing the steering avoidance control, the vehicle driving assistance apparatus 10 repeatedly acquires the lane end distance Dend and repeatedly determines whether the lane end distance Dend becomes equal to or smaller than a predetermined distance Dend_th.

When the lane end distance Dend becomes equal to or smaller than the predetermined distance Dend_th, the vehicle driving assistance apparatus 10 determines that the own vehicle 100 departs from the own vehicle moving lane LN and sets the target steering angle AGtgt and the target deceleration Gtgt by executing a first process. The first process includes a first target steering angle setting process and a first deceleration setting process.

<First Target Steering Angle Setting Process>

The first target steering angle setting process is a process to (i) acquire a value by changing the defined steering angle AGbase (i.e., the steering angle determined by the steering angle control pattern) so as to move the own vehicle 100 toward the center of the own vehicle moving lane LN and (ii) set the acquired value as the target steering angle AGtgt. In other words, the first target steering angle setting process is a process to (i) acquire a value by changing the defined steering angle AGbase so as to move the own vehicle 100 away from the lane end END of the own vehicle moving lane LN beyond which the own vehicle 100 may move and (ii) set the acquired value as the target steering angle AGtgt.

Figure 7:
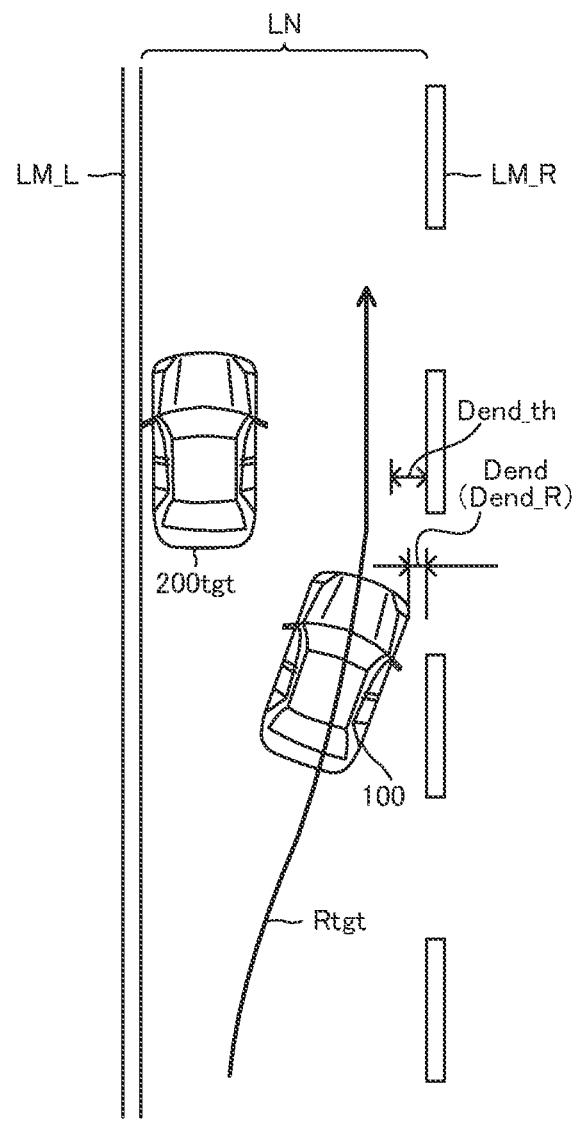
FIG. 7 is a view which shows a scene that the right end distance becomes smaller than a predetermined distance while the steering avoidance control is executed.

For example, as shown in FIG. 7, when the target moving route Rtgt passes through the right side of the avoidance target object 200tgt, and the vehicle driving assistance apparatus 10 determines that the lane end distance Dend becomes equal to or smaller than the predetermined distance Dend_th in the latter half of the steering avoidance control by which the steering angle of the own vehicle 100 is controlled to an angle for turning the own vehicle 100 left, the vehicle driving assistance apparatus 10 executes the first target steering angle setting process as described below.

The vehicle driving assistance apparatus 10 executes the first target steering angle setting process to (i) calculate and acquire a first steering angle correction value dAG1 (i.e., a value to be added to the defined steering angle AGbase for increasing a degree of turning the own vehicle 100 left), (ii) acquire a value by adding the acquired first steering angle correction value dAG1 to the defined steering angle AGbase, and (iii) set the acquired value as the target steering angle AGtgt.

Figure 8:
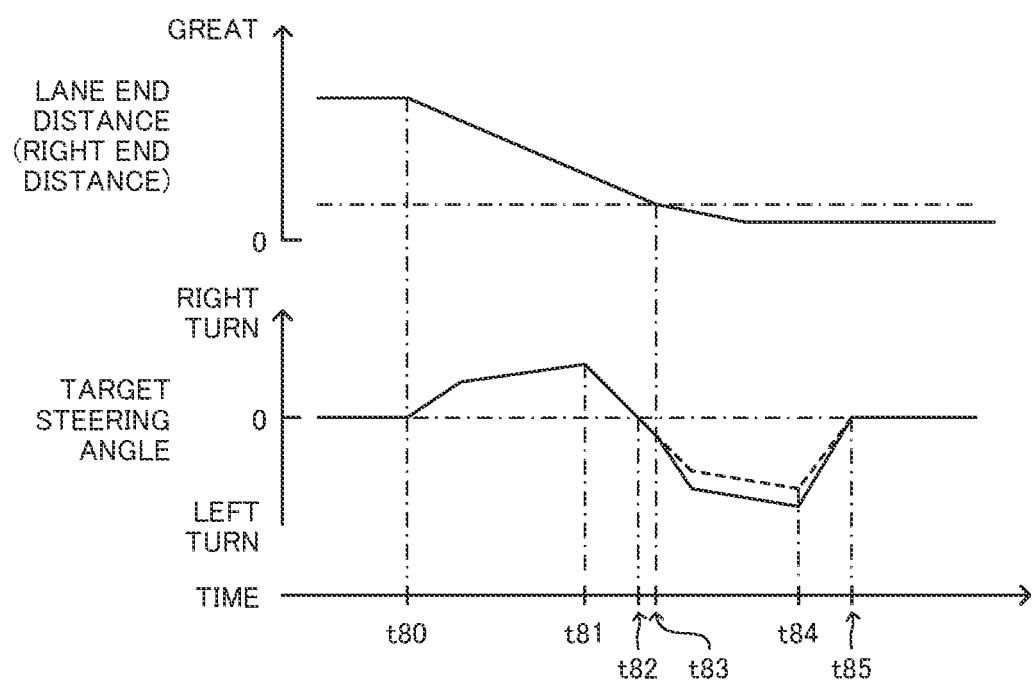
FIG. 8 is a view which shows a time chart which shows a change of a target steering angle when the right end distance becomes equal to or smaller than the predetermined distance in the latter half of the steering avoidance control by which a steering angle of the own vehicle is controlled to an angle for turning the own vehicle left when the target moving route is a route which passes through the right side of an avoidance target vehicle.

Thereby, when (i) the target moving route Rtgt is a route passing through the right side of the avoidance target object 200tgt, and (ii) the vehicle driving assistance apparatus 10 determines that the lane end distance Dend becomes equal to or smaller than the predetermined distance Dend_th at a point of time t83 (see FIG. 8) in the latter half of the steering avoidance control by which the steering angle of the own vehicle 100 is controlled to an angle for turning the own vehicle 100 left as shown in FIG. 8, the target steering angle AGtgt is set as shown by a solid line by setting a value changed from the defined steering angle AGbase shown by a dashed line as the target steering angle AGtgt.

In particular, from the point of time t83 when the lane end distance Dend becomes equal to or smaller than the predetermined distance Dend_th to a point of time t85 when the defined steering angle AGbase becomes zero, the vehicle driving assistance apparatus 10 (i) calculates and acquires the first steering angle correction value dAG1 (i.e., a value to be added to the defined steering angle AGbase for increasing the degree of turning the own vehicle 100 left), based on a difference between the lane end distance Dend and the predetermined distance Dend_th, (ii) acquires a value by adding the acquired first steering angle correction value dAG1 to the defined steering angle AGbase, and (iii) sets the acquired value as the target steering angle AGtgt. In this case, the vehicle driving assistance apparatus 10 (i) acquires a value by adding the first steering angle correction value dAG1 increasing as the defined steering angle AGbase increases to the defined steering angle AGbase and (ii) sets the acquired value as the target steering angle AGtgt. That is, the vehicle driving assistance apparatus 10 (i) acquires a value by adding the first steering angle correction value dAG1 decreasing as the defined steering angle AGbase decreases to the defined steering angle AGbase and (ii) sets the acquired value as the target steering angle AGtgt. It should be noted that when the defined steering angle AGbase is zero, the vehicle driving assistance apparatus 10 sets the first steering angle correction value dAG1 to zero and sets the target steering angle AGtgt. Thus, when the defined steering angle AGbase is zero, the target steering angle AGtgt is set to zero.

It should be noted that in an example shown in FIG. 8, at a point of time t80, the steering avoidance control starts to be executed, and the target steering angle AGtgt starts to be increased in a range of turning the own vehicle 100 right. Then, at a point of time t81, the target steering angle AGtgt starts to be decreased in the range of turning the own vehicle 100 right. Then, at a point of time t82, the target steering angle AGtgt starts to be increased in a range of turning the own vehicle 100 left. Then, at a point of time t84, the target steering angle AGtgt starts to be decreased in the range of turning the own vehicle 100 left. Then, at the point of time t85, the target steering angle AGtgt becomes zero and after the point of time t85, the target steering angle AGtgt continues to be zero.

On the other hand, when (i) the target moving route Rtgt is a route passing through the right side of the avoidance target object 200tgt, and (ii) the vehicle driving assistance apparatus 10 determines that the lane end distance Dend becomes equal to or smaller than the predetermined distance Dend_th in the first half of the steering avoidance control by which the steering angle of the own vehicle 100 is controlled to an angle for turning the own vehicle 100 right, the vehicle driving assistance apparatus 10 executes the first target steering angle setting process as follows.

While the own vehicle 100 turns right, the vehicle driving assistance apparatus 10 executes the first target steering angle setting process to (i) calculate and acquire the first steering angle correction value dAG1 (i.e., a value to be subtracted from the defined steering angle AGbase for decreasing a degree of turning the own vehicle 100 right), (ii) acquire a value by subtracting the acquired first steering angle correction value dAG1 from the defined steering angle AGbase, and (iii) set the acquired value as the target steering angle AGtgt. After the own vehicle 100 starts to turn left, the vehicle driving assistance apparatus 10 executes the first target steering angle setting process to (i) calculate and acquire the first steering angle correction value dAG1 (i.e., a value to be added to the defined steering angle AGbase for increasing the degree of turning the own vehicle 100 left), (ii) acquire a value by adding the acquired first steering angle correction value dAG1 to the defined steering angle AGbase, and (iii) set the acquired value as the target steering angle AGtgt.

Figure 9:
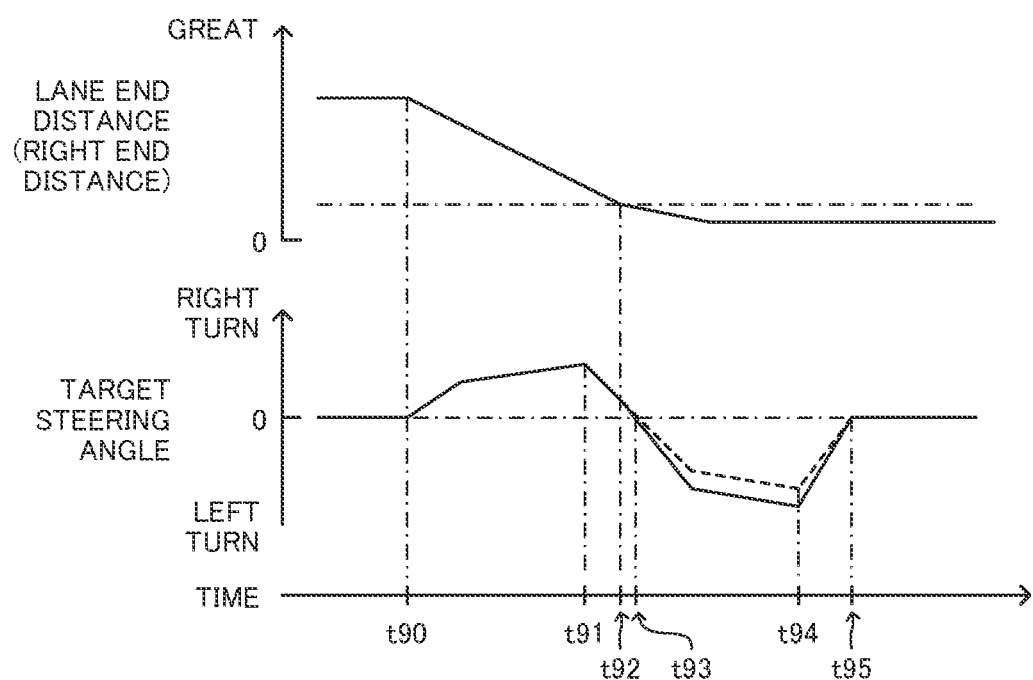
FIG. 9 is a view which shows a time chart which shows the change of the target steering angle when the right end distance becomes equal to or smaller than the predetermined distance in the first half of the steering avoidance control by which the steering angle of the own vehicle is controlled to an angle for turning the own vehicle right when the target moving route is the route which passes through the right side of the avoidance target vehicle.

Thereby, when (i) the target moving route Rtgt is a route passing through the right side of the avoidance target object 200tgt, and (ii) the vehicle driving assistance apparatus 10 determines that the lane end distance Dend becomes equal to or smaller than the predetermined distance Dend_th at a point of time t92 (see FIG. 9) in the first half of the steering avoidance control by which the steering angle of the own vehicle 100 is controlled to an angle for turning the own vehicle 100 right as shown in FIG. 9, the target steering angle AGtgt is set as shown by a solid line by setting a value changed from the defined steering angle AGbase shown by a dashed line as the target steering angle AGtgt.

In particular, from the point of time t92 when the lane end distance Dend becomes equal to or smaller than the predetermined distance Dend_th to a point of time t95 when the defined steering angle AGbase becomes zero, while the own vehicle 100 turns right, the vehicle driving assistance apparatus 10 (i) calculates and acquires the first steering angle correction value dAG1 (i.e., a value to be subtracted from the defined steering angle AGbase for decreasing the degree of turning the own vehicle 100 right), (ii) acquires a value by subtracting the acquired first steering angle correction value dAG1 from the defined steering angle AGbase, and (iii) sets the acquired value as the target steering angle AGtgt. After the own vehicle 100 starts to turn left, the vehicle driving assistance apparatus 10 (i) calculates and acquires the first steering angle correction value dAG1 (i.e., a value to be added to the defined steering angle AGbase for increasing the degree of turning the own vehicle 100 left), (ii) acquires a value by adding the acquired first steering angle correction value dAG1 to the defined steering angle AGbase, and (iii) sets the acquired value as the target steering angle AGtgt. In this case, while the own vehicle 100 turns right, the vehicle driving assistance apparatus 10 (i) acquires a value by subtracting the first steering angle correction value dAG1 decreasing as the defined steering angle AGbase increases from the defined steering angle AGbase and (ii) sets the acquired value as the target steering angle AGtgt. After the own vehicle 100 starts to turn left, the vehicle driving assistance apparatus 10 (i) acquires a value by adding the first steering angle correction value dAG1 increasing as the defined steering angle AGbase increases to the defined steering angle AGbase and (ii) sets the acquired value as the target steering angle AGtgt. That is, the vehicle driving assistance apparatus 10 (i) acquires a value by adding the first steering angle correction value dAG1 decreasing as the defined steering angle AGbase decreases to the defined steering angle AGbase and (ii) sets the acquired value as the target steering angle AGtgt. It should be noted that when the defined steering angle AGbase is zero, the vehicle driving assistance apparatus 10 sets the first steering angle correction value dAG1 to zero and sets the target steering angle AGtgt. Thus, when the defined steering angle AGbase is zero, the target steering angle AGtgt is set to zero.

It should be noted that in an example shown in FIG. 9, at a point of time t90, the steering avoidance control starts to be executed, and the target steering angle AGtgt starts to be increased in the range of turning the own vehicle 100 right. Then, at a point of time t91, the target steering angle AGtgt starts to be decreased in the range of turning the own vehicle 100 right. Then, at a point of time t93, the target steering angle AGtgt starts to be increased in the range of turning the own vehicle 100 left. Then, at a point of time t94, the target steering angle AGtgt starts to be decreased in the range of turning the own vehicle 100 left. Then, at the point of time t95, the target steering angle AGtgt becomes zero and after the point of time t95, the target steering angle AGtgt continues to be zero.

On the other hand, when the target moving route Rtgt passes through the left side of the avoidance target object 200tgt, and the vehicle driving assistance apparatus 10 determines that the lane end distance Dend becomes equal to or smaller than the predetermined distance Dend_th in the latter half of the steering avoidance control by which the steering angle of the own vehicle 100 is controlled to an angle for turning the own vehicle 100 right, the vehicle driving assistance apparatus 10 executes the first target steering angle setting process as described below.

The vehicle driving assistance apparatus 10 executes the first target steering angle setting process to (i) calculate and acquire the first steering angle correction value dAG1 (i.e., a value to be added to the defined steering angle AGbase for increasing the degree of turning the own vehicle 100 right), (ii) acquires a value by adding the acquired first steering angle correction value dAG1 to the defined steering angle AGbase, and (iii) set the acquired value as the target steering angle AGtgt.

Figure 10:
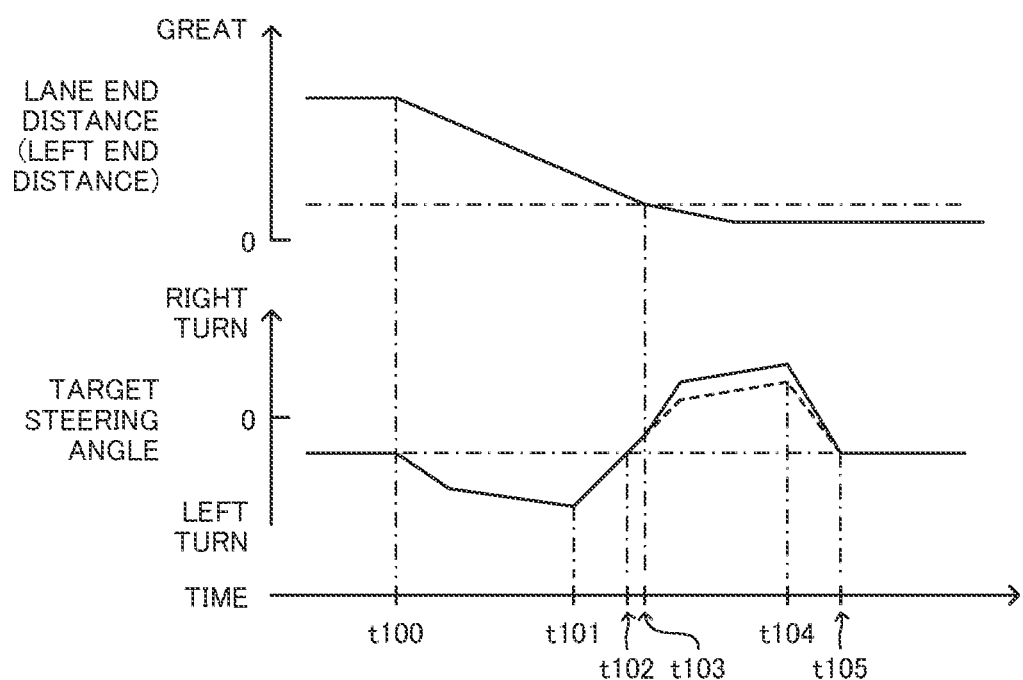
FIG. 10 is a view which shows a time chart which shows the change of the target steering angle when the left end distance becomes equal to or smaller than the predetermined distance in the latter half of the steering avoidance control by which the steering angle of the own vehicle is controlled to an angle for turning the own vehicle right when the target moving route is a route which passes through the left side of the avoidance target vehicle.

Thereby, when (i) the target moving route Rtgt is a route passing through the left side of the avoidance target object 200tgt, and (ii) the vehicle driving assistance apparatus 10 determines that the lane end distance Dend becomes equal to or smaller than the predetermined distance Dend_th at a point of time t103 (see FIG. 10) in the latter half of the steering avoidance control by which the steering angle of the own vehicle 100 is controlled to an angle for turning the own vehicle 100 left as shown in FIG. 10, the target steering angle AGtgt is set as shown by a solid line by setting a value changed from the defined steering angle AGbase shown by a dashed line as the target steering angle AGtgt.

In particular, from the point of time t103 when the lane end distance Dend becomes equal to or smaller than the predetermined distance Dend_th to a point of time t105 when the defined steering angle AGbase becomes zero, the vehicle driving assistance apparatus 10 (i) calculates and acquires the first steering angle correction value dAG1 (i.e., a value to be added to the defined steering angle AGbase for increasing the degree of turning the own vehicle 100 right), (ii) acquires a value acquired by adding the acquired first steering angle correction value dAG1 to the defined steering angle AGbase, and (iii) sets the acquired value as the target steering angle AGtgt. In this case, the vehicle driving assistance apparatus 10 (i) acquires a value by adding the first steering angle correction value dAG1 increasing as the defined steering angle AGbase increases to the defined steering angle AGbase and (ii) sets the acquired value as the target steering angle AGtgt. That is, the vehicle driving assistance apparatus 10 (i) acquires a value by adding the first steering angle correction value dAG1 decreasing as the defined steering angle AGbase decreases to the defined steering angle AGbase and (ii) sets the acquired value as the target steering angle AGtgt. It should be noted that when the defined steering angle AGbase is zero, the vehicle driving assistance apparatus 10 sets the first steering angle correction value dAG1 to zero and sets the target steering angle AGtgt. Thus, when the defined steering angle AGbase is zero, the target steering angle AGtgt is set to zero.

It should be noted that in an example shown in FIG. 10, at a point of time t100, the steering avoidance control starts to be executed, and the target steering angle AGtgt starts to be increased in the range of turning the own vehicle 100 left. Then, at a point of time t101, the target steering angle AGtgt starts to be decreased in the range of turning the own vehicle 100 left. Then, at a point of time t102, the target steering angle AGtgt starts to be increased in the range of turning the own vehicle 100 right. Then, at a point of time t104, the target steering angle AGtgt starts to be decreased in the range of turning the own vehicle 100 right. Then, at the point of time t105, the target steering angle AGtgt becomes zero and after the point of time t105, the target steering angle AGtgt continues to be zero.

On the other hand, when (i) the target moving route Rtgt is a route passing through the left side of the avoidance target object 200tgt, and (ii) the vehicle driving assistance apparatus 10 determines that the lane end distance Dend becomes equal to or smaller than the predetermined distance Dend_th in the first half of the steering avoidance control by which the steering angle of the own vehicle 100 is controlled to an angle for turning the own vehicle 100 left, the vehicle driving assistance apparatus 10 executes the first target steering angle setting process as follows.

While the own vehicle 100 turns left, the vehicle driving assistance apparatus 10 executes the first target steering angle setting process to (i) calculate and acquire the first steering angle correction value dAG1 (i.e., a value to be subtracted from the defined steering angle AGbase for decreasing the degree of turning the own vehicle 100 left), (ii) acquire a value by subtracting the acquired first steering angle correction value dAG1 from the defined steering angle AGbase, and (iii) set the acquired value as the target steering angle AGtgt. After the own vehicle 100 starts to turn right, the vehicle driving assistance apparatus 10 executes the first target steering angle setting process to (i) calculate and acquire the first steering angle correction value dAG1 (i.e., a value to be added to the defined steering angle AGbase for increasing the degree of turning the own vehicle 100 right), (ii) acquire a value by adding the acquired first steering angle correction value dAG1 to the defined steering angle AGbase, and (iii) set the acquired value as the target steering angle AGtgt.

Figure 11:
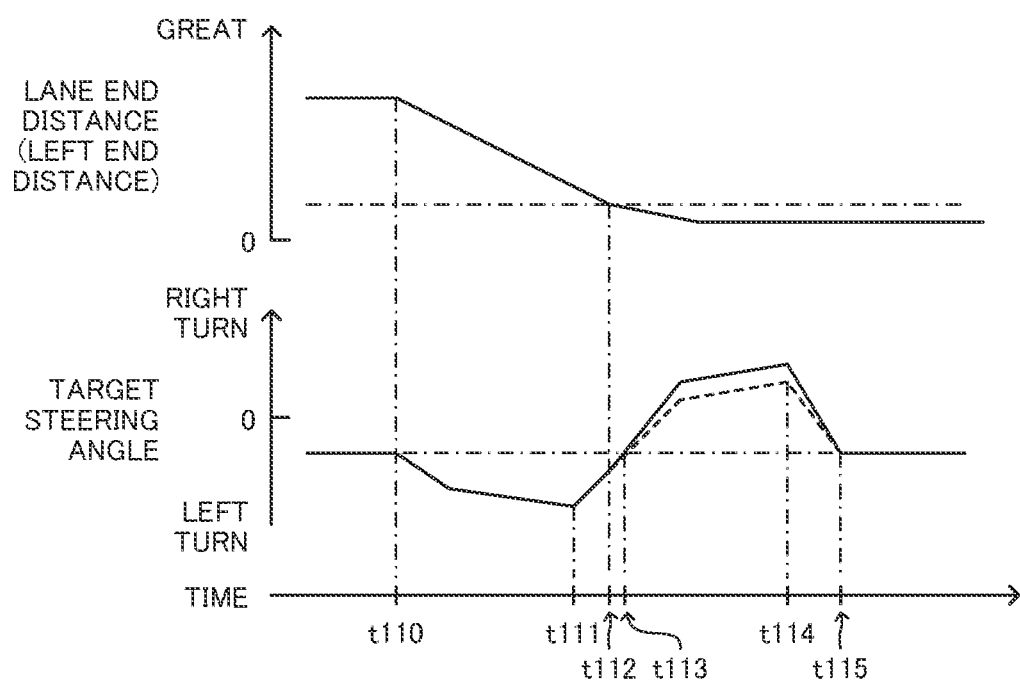
FIG. 11 is a view which shows a time chart which shows the change of the target steering angle when the right end distance becomes equal to or smaller than the predetermined distance in the first half of the steering avoidance control by which the steering angle of the own vehicle is controlled to an angle for turning the own vehicle left when the target moving route is the route which passes through the left side of the avoidance target vehicle.

Thereby, when (i) the target moving route Rtgt is a route passing through the left side of the avoidance target object 200tgt, and (ii) the vehicle driving assistance apparatus 10 determines that the lane end distance Dend becomes equal to or smaller than the predetermined distance Dend_th at a point of time t112 (see FIG. 11) in the first half of the steering avoidance control by which the steering angle of the own vehicle 100 is controlled to an angle for turning the own vehicle 100 left as shown in FIG. 11, the target steering angle AGtgt is set as shown by a solid line by setting a value changed from the defined steering angle AGbase shown by a dashed line as the target steering angle AGtgt.

In particular, from the point of time t112 when the lane end distance Dend becomes equal to or smaller than the predetermined distance Dend_th to a point of time t115 when the defined steering angle AGbase becomes zero, while the own vehicle 100 turns left, the vehicle driving assistance apparatus 10 (i) calculates and acquires the first steering angle correction value dAG1 (i.e., a value to be subtracted from the defined steering angle AGbase for decreasing the degree of turning the own vehicle 100 left), (ii) acquires a value by subtracting the acquired first steering angle correction value dAG1 from the defined steering angle AGbase, and (iii) sets the acquired value as the target steering angle AGtgt. After the own vehicle 100 starts to turn right, the vehicle driving assistance apparatus 10 (i) calculates and acquires the first steering angle correction value dAG1 (i.e., a value to be added to the defined steering angle AGbase for increasing the degree of turning the own vehicle 100 right), (ii) acquires a value by adding the acquired first steering angle correction value dAG1 to the defined steering angle AGbase, and (iii) sets the acquired value as the target steering angle AGtgt. In this case, while the own vehicle 100 turns left, the vehicle driving assistance apparatus 10 (i) acquires a value by subtracting the first steering angle correction value dAG1 decreasing as the defined steering angle AGbase increases from the defined steering angle AGbase and (ii) sets the acquired value as the target steering angle AGtgt. After the own vehicle 100 starts to turn right, the vehicle driving assistance apparatus 10 (i) acquires a value by adding the first steering angle correction value dAG1 increasing as the defined steering angle AGbase increases to the defined steering angle AGbase and (ii) sets the acquired value as the target steering angle AGtgt. That is, the vehicle driving assistance apparatus 10 (i) acquires a value by adding the first steering angle correction value dAG1 decreasing as the defined steering angle AGbase decreases to the defined steering angle AGbase and (ii) sets the acquired value as the target steering angle AGtgt. It should be noted that when the defined steering angle AGbase is zero, the vehicle driving assistance apparatus 10 sets the first steering angle correction value dAG1 to zero and sets the target steering angle AGtgt. Thus, when the defined steering angle AGbase is zero, the target steering angle AGtgt is set to zero.

It should be noted that in an example shown in FIG. 11, at a point of time t110, the steering avoidance control starts to be executed, and the target steering angle AGtgt starts to be increased in the range of turning the own vehicle 100 left. Then, at a point of time t111, the target steering angle AGtgt starts to be decreased in the range of turning the own vehicle 100 left. Then, at a point of time t113, the target steering angle AGtgt starts to be increased in the range of turning the own vehicle 100 right. Then, at a point of time t114, the target steering angle AGtgt starts to be decreased in the range of turning the own vehicle 100 right. Then, at the point of time t115, the target steering angle AGtgt becomes zero and after the point of time t115, the target steering angle AGtgt continues to be zero.

<First Deceleration Setting Process>

The first deceleration process is executed when the lane end distance Dend becomes equal to or smaller than the predetermined distance Dend_th. The deceleration setting process is a process to (i) calculate and acquire a first deceleration correction value dG1 (i.e., a value to be added to the defined deceleration Gbase for increasing the defined deceleration Gbase to surely avoid a departure of the own vehicle 100 from the own vehicle moving lane LN), (ii) acquires a value by adding the acquired first deceleration correction value dG1 to the defined deceleration Gbase, and (iii) set the acquired value as the target deceleration Gtgt.

It should be noted that when the departure of the own vehicle 100 from the own vehicle moving lane LN can be surely avoided without increasing the deceleration of the own vehicle 100, the first deceleration correction value dG1 is set to zero, and the defined deceleration Gbase is set as the target deceleration Gtgt.

Thereby, when the own vehicle 100 approaches the lane end END to have the increased probability that the own vehicle 100 departs from the own vehicle moving lane LN while the steering avoidance control is executed, the departure of the own vehicle 100 from the own vehicle moving lane LN and the collision of the own vehicle 100 with the avoidance target object 200tgt can be avoided.

<Second Process>

While the steering avoidance control is executed, the own vehicle 100 may not move along the target moving route Rtgt and may move off the target moving route Rtgt even by setting the defined steering angle AGbase as the target steering angle AGtgt and setting the defined deceleration Gbase as the target deceleration Gtgt due to the properties of the steering apparatus 23 and the braking apparatus 22 of the own vehicle 100 and the condition of the road on which the own vehicle 100 moves. Further, the own vehicle 100 may move off the target moving route Rtgt when the own vehicle 100 is steered by the target steering angle AGtgt set by the first process described above.

Accordingly, while the vehicle driving assistance apparatus 10 executes the steering avoidance control, the vehicle driving assistance apparatus 10 changes the target steering angle AGtgt so as so decrease a route deviation amount dW (i.e., a deviation amount of the own vehicle 100 from the target moving route Rtgt) when the own vehicle 100 deviates from the target moving route Rtgt by a predetermined amount or more. In other words, while the vehicle driving assistance apparatus 10 executes the steering avoidance control, the vehicle driving assistance apparatus 10 changes the target steering angle AGtgt so as so move the own vehicle 100 toward the target moving route Rtgt when the own vehicle 100 deviates from the target moving route Rtgt by the predetermined amount or more.

Figure 12:
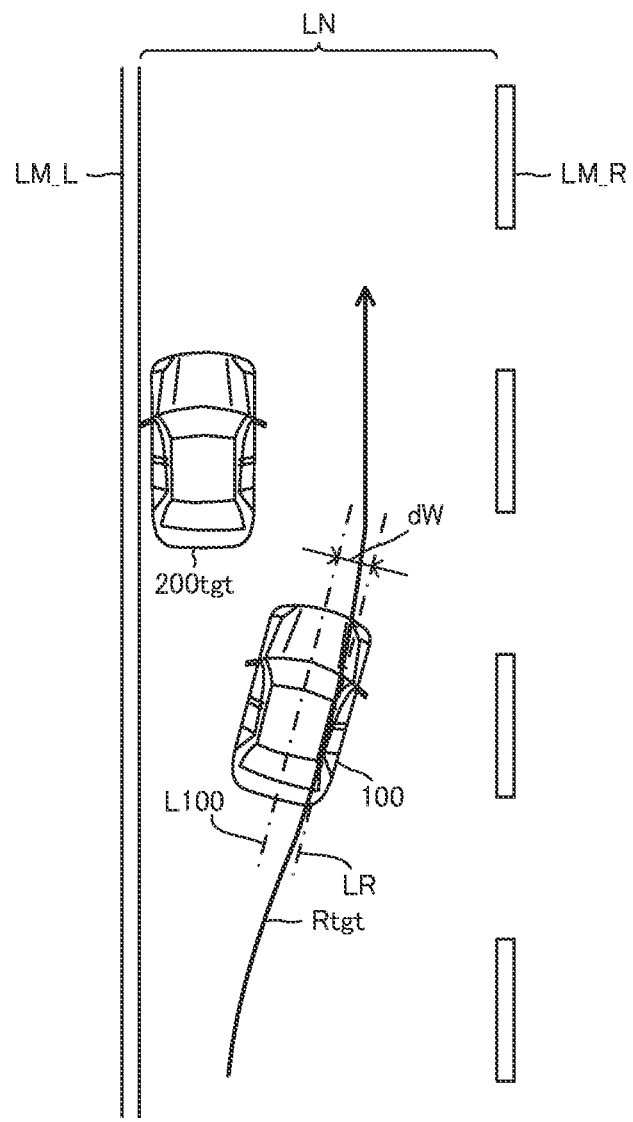
FIG. 12 is a view which shows a deviation amount of the own vehicle from the target moving route.

In particular, in this embodiment, when the vehicle driving assistance apparatus 10 starts executing the steering avoidance control, the vehicle driving assistance apparatus 10 acquires the route deviation amount dW. As shown in FIG. 12, the route deviation amount dW is a distance between a tangent line at a point on the target moving route Rtgt corresponding to a position of the own vehicle 100 and an own vehicle center longitudinal line L100. FIG. 12 shows the route deviation amount dW when the own vehicle 100 deviates leftward from the target moving route Rtgt. Also, when the own vehicle 100 deviates rightward from the target moving route Rtgt, the vehicle driving assistance apparatus 10 acquires as the route deviation amount dW, the distance between the tangent line at the point on the target moving route Rtgt corresponding to the position of the own vehicle 100 and the own vehicle center longitudinal line L100.

While the vehicle driving assistance apparatus 10 executes the steering avoidance control, the vehicle driving assistance apparatus 10 acquires the route deviation amount dW and determines whether the route deviation amount dW is equal to or greater than a predetermined deviation amount dW_th with a predetermined cycle.

When the route deviation amount dW becomes equal to or greater than the predetermined deviation amount dW_th, the vehicle driving assistance apparatus 10 sets the target steering angle AGtgt and the target deceleration Gtgt by a second process, independently of whether the lane end distance Dend is equal to or greater than the predetermined distance Dend_th. The second process includes a second target steering angle setting process and a second target deceleration setting process.

<Second Target Steering Angle Setting Process>

The second target steering angle setting process is a process to (i) acquire a value by changing the defined steering angle AGbase so as to decrease the route deviation amount dW and (ii) set the acquired value as the target steering angle AGtgt. In other words, the second target steering angle setting process is a process to (i) acquire a value by changing the defined steering angle AGbase so as to move the own vehicle 100 toward the target moving route Rtgt and (ii) set the acquired value as the target steering angle AGtgt.

Figure 13:
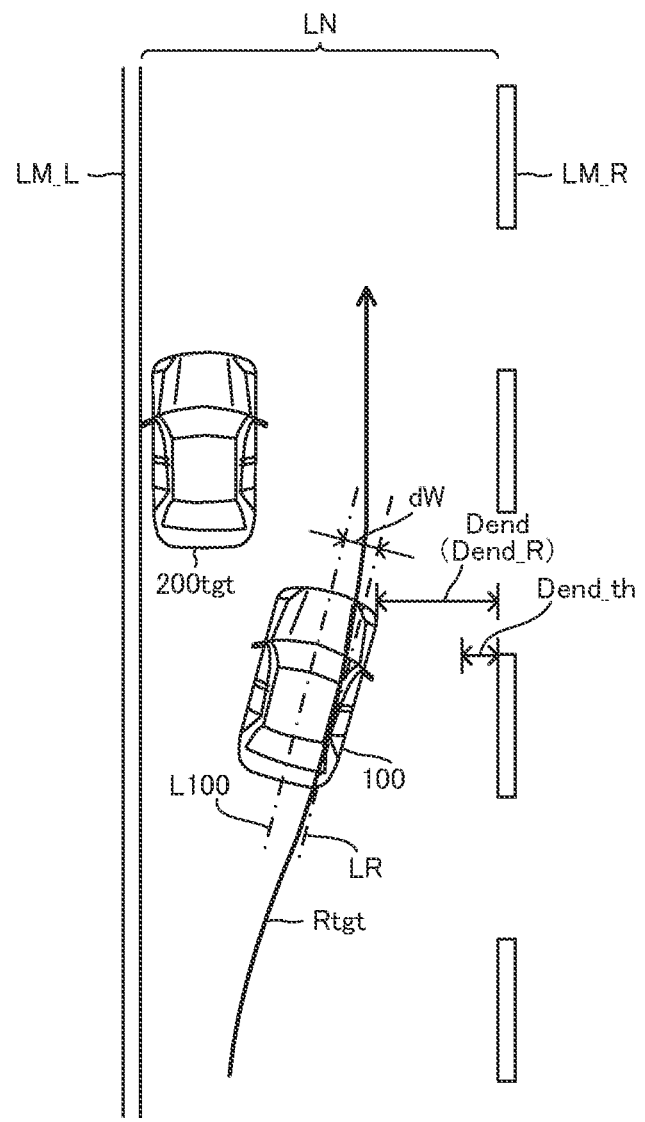
FIG. 13 is a view which shows a scene that the deviation amount of the own vehicle from the target moving route becomes equal to or greater than a predetermined deviation amount.

For example, as shown in FIG. 13, when (i) the steering angle of the own vehicle 100 is controlled to an angle for turning the own vehicle 100 left, (ii) the own vehicle 100 deviates leftward from the target moving route Rtgt, and (iii) the route deviation amount dW becomes equal to or greater than the predetermined deviation amount dW_th, the vehicle driving assistance apparatus 10 (i) calculates and acquires a second steering angle correction value dAG2 (i.e., a value to be subtracted from the defined steering angle AGbase for decreasing the degree of turning the own vehicle 100 left), based on the route deviation amount dW, (ii) acquires a value by subtracting the acquired second steering angle correction value dAG2 from the defined steering angle AGbase and (iii) sets the acquired value as the target steering angle AGtgt.

On the other hand, when (i) the steering angle of the own vehicle 100 is controlled to an angle for turning the own vehicle 100 left, (ii) the own vehicle 100 deviates rightward from the target moving route Rtgt, and (iii) the route deviation amount dW becomes equal to or greater than the predetermined deviation amount dW_th, the vehicle driving assistance apparatus 10 (i) calculates and acquires the second steering angle correction value dAG2 (i.e., a value to be added to the defined steering angle AGbase for increasing the degree of turning the own vehicle 100 left), based on the route deviation amount dW, (ii) acquires a value by adding the acquired second steering angle correction value dAG2 to the defined steering angle AGbase, and (iii) sets the acquired value as the target steering angle AGtgt.

On the other hand, when (i) the steering angle of the own vehicle 100 is controlled to an angle for turning the own vehicle 100 right, (ii) the own vehicle 100 deviates rightward from the target moving route Rtgt, and (iii) the route deviation amount dW becomes equal to or greater than the predetermined deviation amount dW_th, the vehicle driving assistance apparatus 10 (i) calculates and acquires the second steering angle correction value dAG2 (i.e., a value to be subtracted from the defined steering angle AGbase for decreasing the degree of turning the own vehicle 100 right), based on the route deviation amount dW, (ii) acquires a value by subtracting the acquired second steering angle correction value dAG2 from the defined steering angle AGbase, and (iii) sets the acquired value as the target steering angle AGtgt.

On the other hand, when (i) the steering angle of the own vehicle 100 is controlled to an angle for turning the own vehicle 100 right, (ii) the own vehicle 100 deviates leftward from the target moving route Rtgt, and (iii) the route deviation amount dW becomes equal to or greater than the predetermined deviation amount dW_th, the vehicle driving assistance apparatus 10 (i) calculates and acquires the second steering angle correction value dAG2 (i.e., a value to be added to the defined steering angle AGbase for increasing the degree of turning the own vehicle 100 right), based on the route deviation amount dW, (ii) acquires a value by adding the acquired second steering angle correction value dAG2 to the defined steering angle AGbase, and (iii) sets the acquired value as the target steering angle AGtgt.

<Second Target Deceleration Setting Process>

The second target deceleration setting process is a process to (i) calculate and acquire a second deceleration correction value dG2 (i.e., a value to be added to the defined deceleration Gbase for increasing the defined deceleration Gbase so as so surely decrease the route deviation amount dW when the steering angle of the own vehicle 100 is controlled at the target steering angle AGtgt set by the second target steering angle setting process), (ii) acquire a value by adding the acquired second deceleration correction value dG2 to the defined deceleration Gbase, and (iii) sets the acquired value as the target deceleration Gtgt.

It should be noted that if the route deviation amount dW is surely decreased when the steering angle of the own vehicle 100 is controlled at the target steering angle AGtgt set by the second target steering angle setting process without increasing the deceleration of the own vehicle 100, the second deceleration correction value dG2 is zero and as a result, the defined deceleration Gbase is set as the target deceleration Gtgt.

Thereby, the own vehicle 100 can be surely moved along the target moving route Rtgt while the steering avoidance control is executed.

It should be noted that the vehicle driving assistance apparatus 10 sets the target steering angle AGtgt and the target deceleration Gtgt by an ordinary process when (i) the route deviation amount dW is smaller than the predetermined deviation amount dW_th, and (ii) the lane end distance Dend is greater than the predetermined distance Dend_th. The ordinary process is a process to (i) set the defined steering angle AGbase as the target steering angle AGtgt and (ii) set the defined deceleration Gbase as the target deceleration Gtgt.

Further, the vehicle driving assistance apparatus 10 may be configured to change the target steering angle AGtgt and the target deceleration Gtgt by the first process by (i) acquiring parameters such as the kinetic momentum of the own vehicle 100 and an angle defined by the own vehicle center longitudinal line L100 and the lane end END, (ii) acquiring a suitable value, based on the parameters, (iii) acquiring a value changed from the defined steering angle AGbase by the suitable value, and (iv) setting the acquired value as the target steering angle AGtgt. The kinetic momentum of the own vehicle 100 includes, for example, at least one of the own vehicle moving speed V100 and the yaw rate YR of the own vehicle 100. The suitable value described above is a value which can surely prevent the own vehicle 100 from departing the own vehicle moving lane LN and surely provide the own vehicle 100 with a sufficient moving safety. Alternatively, the vehicle driving assistance apparatus 10 may be configured to (i) acquire a value by changing the defined steering angle AGbase by a constant value, independently of the parameters described above and (ii) set the acquired value as the target steering angle AGtgt.

The summary of the operations of the vehicle driving assistance apparatus 10 has been described.

<Specific Operations of Vehicle Driving Assistance Apparatus>

Figure 14:
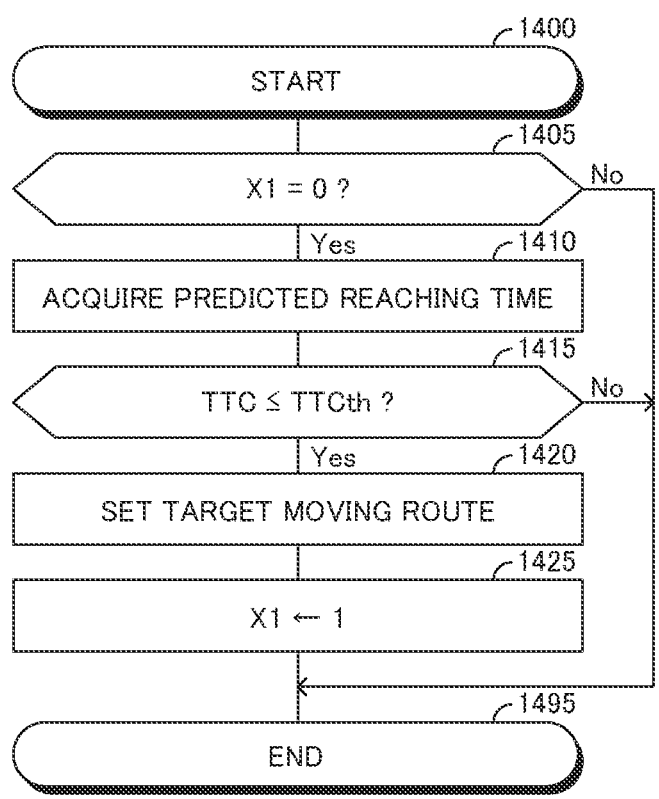
FIG. 14 is a view which shows a flowchart of a routine executed by the vehicle driving assistance apparatus according to the embodiment of the present disclosure.

Next, specific operations of the vehicle driving assistance apparatus 10 will be described. The CPU of the ECU 90 of the vehicle driving assistance apparatus 10 according to the embodiment of the present disclosure is configured or programmed to execute a routine shown in FIG. 14 with a predetermined calculation cycle. Thus, at a predetermined timing, the CPU starts a process from a step 1400 of the routine shown in FIG. 14 and proceeds with the process to a step 1405 to determine whether a value of a steering avoidance control execution flag is "0." The steering avoidance control execution flag X1 represents that the steering avoidance control is executed when the value of the steering avoidance control execution flag X1 is "1." On the other hand, the steering avoidance control execution flag X1 represents that the steering avoidance control is not executed when the value of the steering avoidance control execution flag X1 is "0."

When the CPU determines "Yes" at the step 1405, the CPU proceeds with the process to a step 1410 to acquire the predicted reaching time TTC. Then, the CPU proceeds with the process to a step 1415 to determine whether the steering avoidance control execution condition is satisfied. In particular, the CPU determines whether the predicted reaching time TTC is equal to or smaller than the collision determination time TTCth.

When the CPU determines "Yes" at the step 1415, the CPU proceeds with the process to a step 1420 to set the target moving route Rtgt. Then, the CPU proceeds with the process to a step 1425 to set the value of the steering avoidance control execution flag X1 to "1." Then, the CPU proceeds with the process to a step 1495 to terminate executing this routine once.

On the other hand, when the CPU determines "No" at the step 1405 or the step 1415, the CPU proceeds with the process directly to the step 1495 to terminate executing this routine once.

Figure 15:
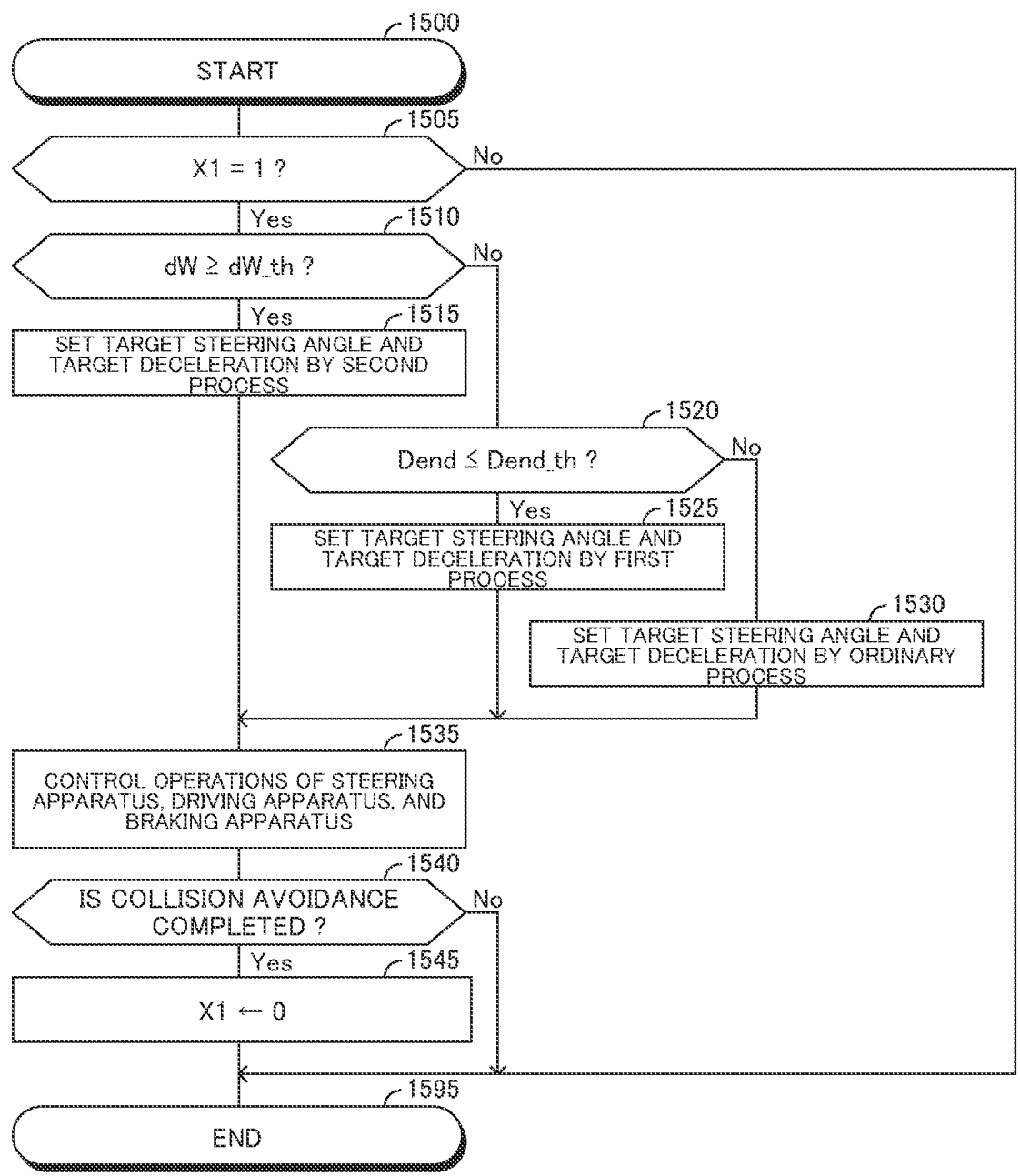
FIG. 15 is a view which shows a flowchart of a routine executed by the vehicle driving assistance apparatus according to the embodiment of the present disclosure.

Further, the CPU is configured or programmed to execute a routine shown in FIG. 15 with the predetermined calculation cycle. Thus, at a predetermined timing, the CPU starts a process from a step 1500 of the routine shown in FIG. 15 and proceeds with the process to a step 1505 to determine whether the value of the steering avoidance control execution flag X1 is "1."

When the CPU determines "Yes" at the step 1505, the CPU proceeds with the process to a step 1510 to determine whether the route deviation amount dW is equal to or greater than the predetermined deviation amount dW_th. When the CPU determines "Yes" at the step 1510, the CPU proceeds with the process to a step 1515 to set the target steering angle AGtgt and the target deceleration Gtgt by the second process described above. Then, the CPU proceeds with the process to a step 1535 to control the operations of the steering apparatus 23, the driving apparatus 21, and the braking apparatus 22 to realize the target steering angle AGtgt and the target deceleration Gtgt set at the step 1515. Then, the CPU proceeds with the process to a step 1540.

On the other hand, when the CPU determine "No" at the step 1510, the CPU proceeds with the process to a step 1520 to determine whether the lane end distance Dend is equal to or smaller than the predetermined distance Dend_th. When the CPU determines "Yes" at the step 1520, the CPU proceeds with the process to a step 1525 to set the target steering angle AGtgt and the target deceleration Gtgt by the first process described above. Then, the CPU proceeds with the process to the step 1535 to control the operations of the steering apparatus 23, the driving apparatus 21, and the braking apparatus 22 to realize the target steering angle AGtgt and the target deceleration Gtgt set at the step 1525. Then, the CPU proceeds with the process to the step 1540.

On the other hand, when the CPU determine "No" at the step 1520, the CPU proceeds with the process to a step 1530 to set the target steering angle AGtgt and the target deceleration Gtgt by the ordinary process described above. Then, the CPU proceeds with the process to the step 1535 to control the operations of the steering apparatus 23, the driving apparatus 21, and the braking apparatus 22 to realize the target steering angle AGtgt and the target deceleration Gtgt set at the step 1530. Then, the CPU proceeds with the process to the step 1540.

When the CPU proceeds with the process to the step 1540, the CPU determines whether an avoidance of the collision of the own vehicle 100 with the avoidance target object 200tgt by the steering avoidance control is completed. When the CPU determine "Yes" at the step 1540, the CPU proceeds with the process to a step 1545 to set the value of the steering avoidance control execution flag X1 to "0." Thereby, an execution of the steering avoidance control is terminated. Then, the CPU proceeds with the process to a step 1595 to terminate executing this routine once.

On the other hand, when the CPU determines "No" at the step 1540, the CPU proceeds with the process directly to the step 1595 to terminate executing this routine once. In this case, the execution of the steering avoidance control continues.

When the CPU determines "No" at the step 1505, the CPU proceeds with the process directly to the step 1595 to terminate executing this routine once.

The specific operations of the vehicle driving assistance apparatus 10 have been described.

It should be noted that the present disclosure is not limited to the aforementioned embodiments, and various modifications can be employed within the scope of the present disclosure.

What is claimed is:

1. A vehicle driving assistance apparatus, comprising an electronic control unit which executes a steering avoidance control to avoid a collision of an own vehicle with an object ahead of the own vehicle by braking and steering the own vehicle when the electronic control unit determines that the own vehicle collides with the object, wherein the steering avoidance control is a control to avoid the collision of the own vehicle with the object by:
   setting a target moving route which passes through a side space of the object and along which the own vehicle is moved by the steering avoidance control, keeping the own vehicle within an own vehicle moving lane in which the own vehicle currently moves;
   setting (i) a steering angle control pattern corresponding to a control pattern of controlling a steering angle of the own vehicle to move the own vehicle along the target moving route and (ii) a deceleration control pattern corresponding to a control pattern of controlling a deceleration of the own vehicle;
   setting (i) a target steering angle corresponding to a target value of the steering angle of the own vehicle, based on the steering angle control pattern and (ii) a target deceleration corresponding to a target value of the deceleration of the own vehicle, based on the deceleration control pattern; and
   controlling (i) the steering angle of the own vehicle so as to correspond to the target steering angle and (ii) the deceleration of the own vehicle so as to correspond to the target deceleration, and
   wherein the electronic control unit is configured to:
   when determining that the own vehicle departs from the own vehicle moving lane while executing the steering avoidance control,
   (i) acquire the steering angle determined by the steering angle control pattern, (ii) change the acquired steering angle to be a value to move the own vehicle toward a center of the own vehicle moving lane, and (iii) set the changed steering angle as the target steering angle; and
   (i) acquire the deceleration determined by the deceleration control pattern, (ii) increase the acquired deceleration, and (iii) set the increased deceleration as the target deceleration.

2. The vehicle driving assistance apparatus as set forth in claim 1, wherein the electronic control unit is configured to:
   when determining that the own vehicle does not depart from the own vehicle moving lane while executing the steering avoidance control,
   (i) acquire the steering angle determined by the steering angle control pattern and (ii) set the acquired steering angle as the target steering angle; and
   (i) acquire the deceleration determined by the deceleration control pattern and (ii) set the acquired deceleration as the target deceleration.

3. The vehicle driving assistance apparatus as set forth in claim 1, wherein the electronic control unit is configured to:
   while executing the steering avoidance control,
   acquire a deviation amount of the own vehicle from the target moving route when determining that the own vehicle does not depart from the own vehicle moving lane; and
   (i) determine that the own vehicle departs from the own vehicle moving lane when the deviation amount is equal to or greater than a predetermined deviation amount, (ii) acquire the steering angle determined by the steering angle control pattern, (iii) change the acquired steering angle so as to decrease the deviation amount, and (iv) set the changed steering angle as the target steering angle, (v) acquire the deceleration determined by the deceleration control pattern, (vi) change the acquired deceleration, and (vii) set the changed deceleration as the target deceleration.

4. The vehicle driving assistance apparatus as set forth in claim 3, wherein the electronic control unit is configured to:
   when determining that the own vehicle does not depart from the own vehicle moving lane, and the deviation amount is smaller than the predetermined deviation amount while executing the steering avoidance control,
   (i) set the steering angle determined by the steering angle control pattern as the target steering angle and (ii) set the deceleration determined by the deceleration control pattern as the target deceleration.

5. A vehicle driving assistance method for executing a steering avoidance control to avoid a collision of an own vehicle with an object ahead of the own vehicle by braking and steering the own vehicle when an electronic control unit determines that the own vehicle collides with the object, wherein the steering avoidance control is a control to avoid the collision of the own vehicle with the object by:
   setting a target moving route which passes through a side space of the object and along which the own vehicle is moved by the steering avoidance control, keeping the own vehicle within an own vehicle moving lane in which the own vehicle currently moves;
   setting (i) a steering angle control pattern corresponding to a control pattern of controlling a steering angle of the own vehicle to move the own vehicle along the target moving route and (ii) a deceleration control pattern corresponding to a control pattern of controlling a deceleration of the own vehicle;
   setting (i) a target steering angle corresponding to a target value of the steering angle of the own vehicle, based on the steering angle control pattern and (ii) a target deceleration corresponding to a target value of the deceleration of the own vehicle, based on the deceleration control pattern; and
   controlling (i) the steering angle of the own vehicle so as to correspond to the target steering angle and (ii) the deceleration of the own vehicle so as to correspond to the target deceleration, and
   wherein the vehicle driving assistance method comprises steps of:
   when determining that the own vehicle departs from the own vehicle moving lane while executing the steering avoidance control,
   (i) acquiring the steering angle determined by the steering angle control pattern, (ii) changing the acquired steering angle to be a value to move the own vehicle toward a center of the own vehicle moving lane, and (iii) setting the changed steering angle as the target steering angle; and (i) acquiring the deceleration determined by the deceleration control pattern, (ii) increasing the acquired deceleration, and (iii) setting the increased deceleration as the target deceleration.

6. A computer-readable storage medium storing a vehicle driving assistance program which executes a steering avoidance control to avoid a collision of an own vehicle with an object ahead of the own vehicle by braking and steering the own vehicle when an electronic control unit determines that the own vehicle collides with the object, wherein the steering avoidance control is a control to avoid the collision of the own vehicle with the object by:

setting a target moving route which passes through a side space of the object and along which the own vehicle is moved by the steering avoidance control, keeping the own vehicle within an own vehicle moving lane in which the own vehicle currently moves;

setting (i) a steering angle control pattern corresponding to a control pattern of controlling a steering angle of the own vehicle to move the own vehicle along the target moving route and (ii) a deceleration control pattern corresponding to a control pattern of controlling a deceleration of the own vehicle;

setting (i) a target steering angle corresponding to a target value of the steering angle of the own vehicle, based on the steering angle control pattern and (ii) a target deceleration corresponding to a target value of the deceleration of the own vehicle, based on the deceleration control pattern; and controlling (i) the steering angle of the own vehicle so as to correspond to the target steering angle and (ii) the deceleration of the own vehicle so as to correspond to the target deceleration, and wherein the vehicle driving assistance program is configured to:

when determining that the own vehicle departs from the own vehicle moving lane while executing the steering avoidance control, (i) acquire the steering angle determined by the steering angle control pattern, (ii) change the acquired steering angle to be a value to move the own vehicle toward a center of the own vehicle moving lane, and (iii) set the changed steering angle as the target steering angle; and (i) acquire the deceleration determined by the deceleration control pattern, (ii) increase the acquired deceleration, and (iii) set the increased deceleration as the target deceleration.

* * * * *